(12) United States Patent
Senda

(10) Patent No.: US 9,277,153 B2
(45) Date of Patent: Mar. 1, 2016

(54) IMAGE PICKUP DEVICE AND IMAGE PICKUP DISPLAY SYSTEM

(71) Applicant: Sony Corporation, Tokyo (JP)

(72) Inventor: Michiru Senda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 14/278,975

(22) Filed: May 15, 2014

(65) Prior Publication Data

US 2014/0347536 A1 Nov. 27, 2014

(30) Foreign Application Priority Data

May 24, 2013 (JP) .................................. 2013-109774

(51) Int. Cl.
*H04N 5/374* (2011.01)
*H04N 5/378* (2011.01)

(52) U.S. Cl.
CPC ............. *H04N 5/3741* (2013.01); *H04N 5/378* (2013.01)

(58) Field of Classification Search
None
See application file for complete search history.

(56) References Cited

U.S. PATENT DOCUMENTS

| 5,303,074 A * | 4/1994 | Salisbury ............... G02F 1/1309 257/292 |
| 6,396,253 B1 * | 5/2002 | Petrick ................... H04N 5/367 324/522 |

* cited by examiner

*Primary Examiner* — Albert Cutler
(74) *Attorney, Agent, or Firm* — Dentons US LLP

(57) ABSTRACT

Provided is an image pickup device that includes: pixels each including a photoelectric conversion element and one or more switching elements; control lines provided to perform open/close control of at least one first switching element; a buffer circuit provided for each control line, and configured to output a voltage to each control line; second switching elements each provided between corresponding one of the control lines and a power source of the corresponding buffer circuit; and a switch control circuit that is, upon image pickup driving, configured to control one of the second switching elements, provided between a defect holding line that includes an electrically short-circuited part in the plurality of control lines and the power source of the buffer circuit of the defect holding line, to be in an open state, and configured to control another one of the second switching elements to be in a closed state.

18 Claims, 24 Drawing Sheets

IN INITIAL RESETTING

IN OPEN CONTROL OF SWITCHES OF DEFECT HOLDING LINE

IMAGE PICKUP DEVICE AND IMAGE PICKUP DISPLAY SYSTEM

CROSS REFERENCE TO RELATED APPLICATIONS

This application claims the benefit of Japanese Priority Patent Application JP 2013-109774 filed May 24, 2013, the entire contents of which is incorporated herein by reference.

BACKGROUND

The present disclosure relates to an image pickup device that includes a photoelectric conversion element and an image pickup display system that includes such an image pickup device.

Various image pickup devices of the type including the photoelectric conversion element in a pixel (an image pickup pixel) are proposed. Examples of such an image pickup device may include, for example, a so-called optical touch panel, a radiation image pickup device and so forth (see, for example, Japanese Unexamined Patent Application Publication No. 2011-135561).

SUMMARY

The image pickup device as described above has such a disadvantage that a so-called line defect occurs caused by an electric short-circuit and so forth of a control line adapted to perform ON/OFF driving on a switching element of each pixel and the image quality of a picked-up image is degraded accordingly.

It is desirable to provide an image pickup device that makes is possible to suppress degradation of the picked-up image quality and an image pickup display system that includes such an image pickup device.

According to an embodiment of the present disclosure, there is provided an image pickup device including: a plurality of pixels each including a photoelectric conversion element and one or more switching elements, the photoelectric conversion element being configured to generate a signal charge based on a wavelength of an incident ray; a plurality of control lines provided to perform open/close control of at least one first switching element in the one or more switching elements; a buffer circuit provided for each of the control lines, and configured to output a voltage to each of the control lines; second switching elements each provided between corresponding one of the control lines and a power source of the corresponding buffer circuit; and a switch control circuit configured to perform open/close control of the second switching elements, the switch control circuit being, upon image pickup driving, configured to control one of the second switching elements, provided between a defect holding line that includes an electrically short-circuited part in the plurality of control lines and the power source of the buffer circuit of the defect holding line, to be in an open state, and configured to control another one of the second switching elements to be in a closed state.

According to an embodiment of the present disclosure, there is provided an image pickup display system provided with an image pickup device and a display configured to perform image display based on an image pickup signal acquired by the image pickup device. The image pickup device includes: a plurality of pixels each including a photoelectric conversion element and one or more switching elements, in which the photoelectric conversion element is configured to generate a signal charge based on a wavelength of an incident ray; a plurality of control lines provided to perform open/close control of at least one first switching element in the one or more switching elements; a buffer circuit provided for each of the control lines, and configured to output a voltage to each of the control lines; second switching elements each provided between corresponding one of the control lines and a power source of the corresponding buffer circuit; and a switch control circuit configured to perform open/close control of the second switching elements. The switch control circuit is, upon image pickup driving, configured to control one of the second switching elements, provided between a defect holding line that includes an electrically short-circuited part in the plurality of control lines and the power source of the buffer circuit of the defect holding line, to be in an open state, and configured to control another one of the second switching elements to be in a closed state.

In the image pickup device and the image pickup display system according to the above-described embodiments of the present disclosure, the second switching elements are disposed between the plurality of control lines provided to perform open/close control of the first switching elements of the respective pixels and the power sources of the respective buffer circuits of the control lines. In image pickup driving, the second switching element, disposed between the defect holding line that includes the electrically short-circuited part in the plurality of control lines and the power source of the buffer circuit of the defect holding circuit, is controlled to be in the open state, and another second switching element is controlled to be in the closed state. Thus, a so-called multiple defect caused by reaching of an adverse effect up to another wiring around the defect holding line is suppressed.

According to the image pickup device and the image pickup display system in the above-described embodiments of the present disclosure, the second switching elements are disposed between the plurality of control lines provided to perform open/close control of the first switching elements of the respective pixels and the power sources of the respective buffer circuits of the control lines. In image pickup driving, the second switching element, disposed between the defect holding line in the plurality of control lines and the power source of the buffer circuit of the defect holding circuit, is controlled to be in the open state, and another second switching element is controlled to be in the closed state, thereby suppressing occurrence of the multiple defect. Hence, it is possible to suppress degradation of the picked-up image quality.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

In the following, an embodiment of the present disclosure will be described in detail with reference to the accompanying drawings. It is to be noted that description will be made in the following order.

1. Embodiment (one example of an image pickup device that performs an image picking-up operation while controlling a switch disposed between a read-out control line that has been electrically short-circuited to a signal line and a power source of a buffer circuit to be in the open state)
2. Modification Example 1 (one example of a case that the read-out control line has been electrically short-circuited to a bias line)
3. Modification Example 2 (one example of a case that a row scanning section and so forth are formed on a substrate that is different from a pixel substrate)
4. Modification Example 3 (one example of a case that a switching element is provided only on one power source side of the buffer circuit)
5. Modification Examples 4-1 and 4-2 (examples of a case that a p-channel type transistor is used in a pixel)

6. Modification Examples 5-1 and 5-2 (other layout examples of the switching element)
7. Modification Examples 6-1 and 6-2 (other layout examples of the switching element)
8. Modification Examples 7-1 and 7-2 (other layout examples of the switching element)
9. Modification Example 8 (another example of a passive type pixel circuit)
10. Modification Example 9 (still another example of the passive type pixel circuit)
11. Modification Examples 10-1 and 10-2 (examples of an active type pixel circuit)
12. Application Example (one example of an image pickup display system)

<Embodiment>
[Configuration]

Figure 1:
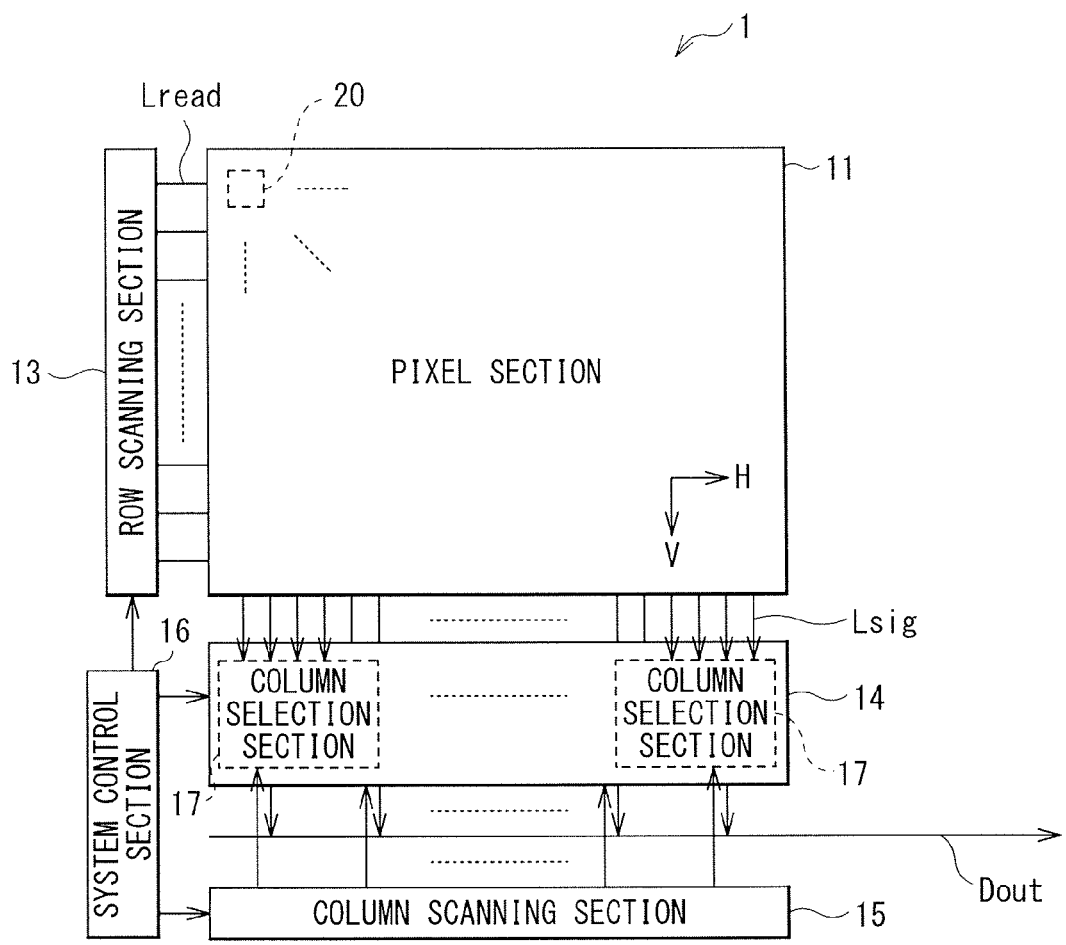
FIG. 1 is a block diagram illustrating one general configuration example of an image pickup device according to one embodiment of the present disclosure.

FIG. 1 is a block diagram illustrating one general block configuration example of an image pickup device (an image pickup device 1) according to one embodiment of the present disclosure. The image pickup device 1 may be adapted to read information of an object (to pick up an image of the object) on the basis of a wavelength of an incident ray (for example, radiation such as X-rays and so forth). The image pickup device 1 includes a pixel section 11, a row scanning section 13, an A/D conversion section 14, a column scanning section 15, and a system control section 16. In the present embodiment, a circuit block that includes at least the row scanning section 13 (including later described buffer circuit 30 and switch control circuit 33) in the above-mentioned constitutional elements is formed on the same substrate as the pixel section 11. In the above-mentioned constitutional elements, the row scanning section 13, the A/D conversion section 14, the column scanning section 15, and the system control section 16 correspond to one specific example of a "drive section" in one embodiment of the present disclosure.

(Pixel Section 11)

The pixel section 11 is adapted to generate a signal charge on the basis of the wavelength of the incident ray. In the pixel section 11, pixels (image pickup pixels and unit pixels) 20 may be two-dimensionally arranged, for example, in a row-by-column form (in a matrix) and each pixel 20 includes a photoelectric conversion element (a later described photoelectric conversion element 21) adapted to generate photocharges of a charge amount in accordance with an incident ray amount of radiation and so forth and to accumulate the photocharges so generated therein. It is to be noted that in the following, description will be made on the assumption that a horizontal direction (a row direction) is referred to as an "H" direction and a vertical direction (a column direction) is referred to as a "V" direction in the pixel section 11 as illustrated in FIG. 1.

Figure 2A:
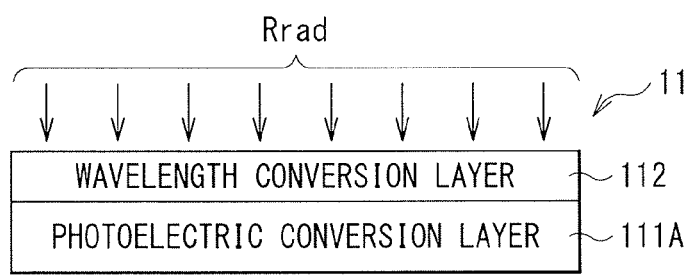
FIG. 2A is a schematic diagram illustrating one schematic configuration example of a pixel section when the image pickup device is of an indirect conversion type.
Figure 2B:
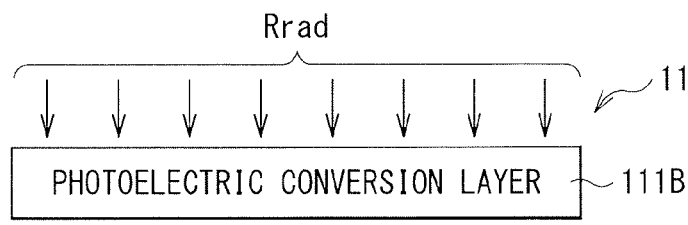
FIG. 2B is a schematic diagram illustrating one schematic configuration example of a pixel section when the image pickup device is of a direct conversion type.

FIG. 2A and FIG. 2B are diagrams each illustrating a schematic configuration example of the pixel section. 11. The pixel section 11 includes a photoelectric conversion layer 111 including the photoelectric conversion element 21 for every pixel 20.

An example of the pixel section 11 illustrated in FIG. 2A may be configured to be applied to a so-called indirect conversion type radiation image pickup device and includes a wavelength conversion layer 112 on the photoelectric conversion layer 111 (111A) (a light receiving surface side). The wavelength conversion layer 112 may be adapted to convert radiation Rrad (for example, α-rays, β-rays, γ-rays, X-rays and so forth) into light of a wavelength in a sensitivity region of the photoelectric conversion layer 111A. The wavelength conversion layer 112 may be configured by a phosphor (for example, scintillators of CsI, NaI, CaF$_2$ and so forth) that converts, for example, X-rays into visible light. The wavelength conversion layer 112 so configured may be of the type that the above-mentioned phosphor layer is formed on, for example, the photoelectric conversion layer 111A via a planarization film made of an organic material or a spin-on-glass material and so forth.

An example of the pixel section 11 illustrated in FIG. 2B may be configured to be applied to a so-called direct conversion type radiation image pickup device and the photoelectric conversion layer 111 (111B) is configured to convert the incident radiation Rrad into an electric signal. In this case, the photoelectric conversion layer 111B may be configured by, for example, an amorphous selenium (a-Se) semiconductor, a cadmium telluride (CdTe) semiconductor and so forth. Although the image pickup device according to one embodiment of the present disclosure may be either the indirect conversion type radiation image pickup device or the direct conversion type radiation image pickup device as described above, description will be made by taking the indirect conversion type device as an example in the following embodiment and so forth.

Figure 3:
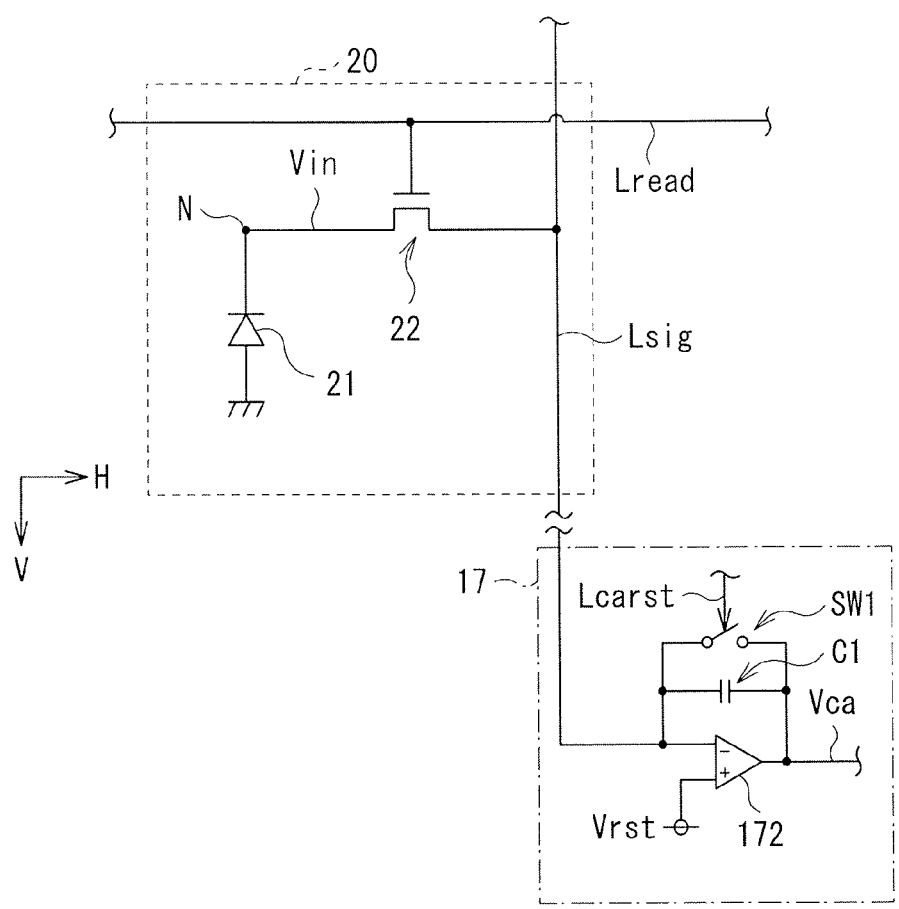
FIG. 3 is a circuit diagram illustrating one detailed configuration example of a pixel and so forth illustrated in FIG. 1.

FIG. 3 is a diagram illustrating one example of a circuit configuration (a so-called passive type circuit configuration) of the pixel 20 together with one example of a circuit configuration of a later described column selection section 17 within the A/D conversion section 14. The passive type pixel 20 may include, for example, one photoelectric conversion element 21 and one transistor 22. In addition, a read-out control line Lread extending along the H direction and a signal line Lsig extending along the V direction are connected to the pixel 20. The read-out control line Lread is a gate line adapted to perform ON/OFF control (switch open/close control) on the transistor 22. The plurality of read-out control lines Lread may be provided for, for example, the pixel section 11 side-by-side with respect to one another and are connected to the respective transistors 22 formed in the pixels of one line.

The photoelectric conversion element 21 may be configured by, for example, a PIN (Positive Intrinsic Negative) type photodiode, a PN type photodiode or a MIS (Metal-Insulator-Semiconductor) type sensor so as to generate signal charges of a charge amount according to an incident light amount. It is to be noted that, here, a cathode of the photoelectric conversion element 21 is connected to an accumulation node N and an anode thereof is grounded or connected to a bias line and is held at a fixed potential.

The transistor 22 is a transistor (a read-out transistor) adapted to enter an ON state in accordance with a row scanning signal supplied from the read-out control line Lread to output the signal charge (a signal Vin) acquired by the photoelectric conversion element 21 to the signal line Lsig. Here, the transistor 22 is configured by an n-channel type (n-type) field effect transistor (FET: Field Effect Transistor). Alternatively, the transistor 22 may be also configured by a p-channel type (p-type) FET and so forth as described later. Examples of material of a channel of the transistor 22 may include silicon-based semiconductors made of non-crystal silicon (amorphous silicon), microcrystalline silicon and/or polycrystalline silicon (poly-silicon) and so forth. Alternatively, oxide semiconductors made of indium gallium zinc oxide (InGaZnO), zinc oxide (ZnO) and so forth may be used. Here, the channel of the transistor 22 may be made of, for example, low-temperature polycrystalline silicon (LTPS).

In each pixel, 20, a gate of the transistor 22 is connected to the read-out control line Lread as described above. A source of the transistor 22 may be connected to, for example, the signal line Lsig and a drain thereof may be connected to, for example, the cathode of the photoelectric conversion element 21 via the accumulation node N.

It is to be noted that the transistor 22 formed in the pixel 20 corresponds to one specific example of a "first switching element" in one embodiment of the present disclosure. In addition, the read-out control line Lread corresponds to one specific example of a "control line" in one embodiment of the present disclosure.

(Row Scanning Section 13)

The row scanning section 13 is a drive circuit (a V driver circuit) configured by including a shift register circuit, a predetermined logic circuit and so forth so as to perform driving (line sequential scanning) in units of rows (in units of horizontal lines) on the plurality of pixels 20 in the pixel section 11. Specifically, the row scanning section 13 reads the signal charge out of each pixel 20 by supplying the row scanning signal to each pixel 20 via the read-out control line Lread. The row scanning signal to be supplied to the read-out control line Lread may be a pulse signal including, for example, two values of a high voltage (positive voltage) value and a low voltage (negative voltage) value. The row scanning signal is current-amplified by the later described buffer circuit (the buffer circuit 30) and thereafter output to the read-out control line Lread.

(A/D Conversion Section 14)

The A/D conversion section 14 may include the plurality of column selection sections 17 provided one for every plural (here, four) signal lines Lsig and is adapted to perform A/D conversion (analog/digital conversion) on the basis of the signal charge input via the signal line Lsig. As a result, output data Dout (an image pickup signal) configured by a digital signal is generated and is output to the outside.

Figure 4:
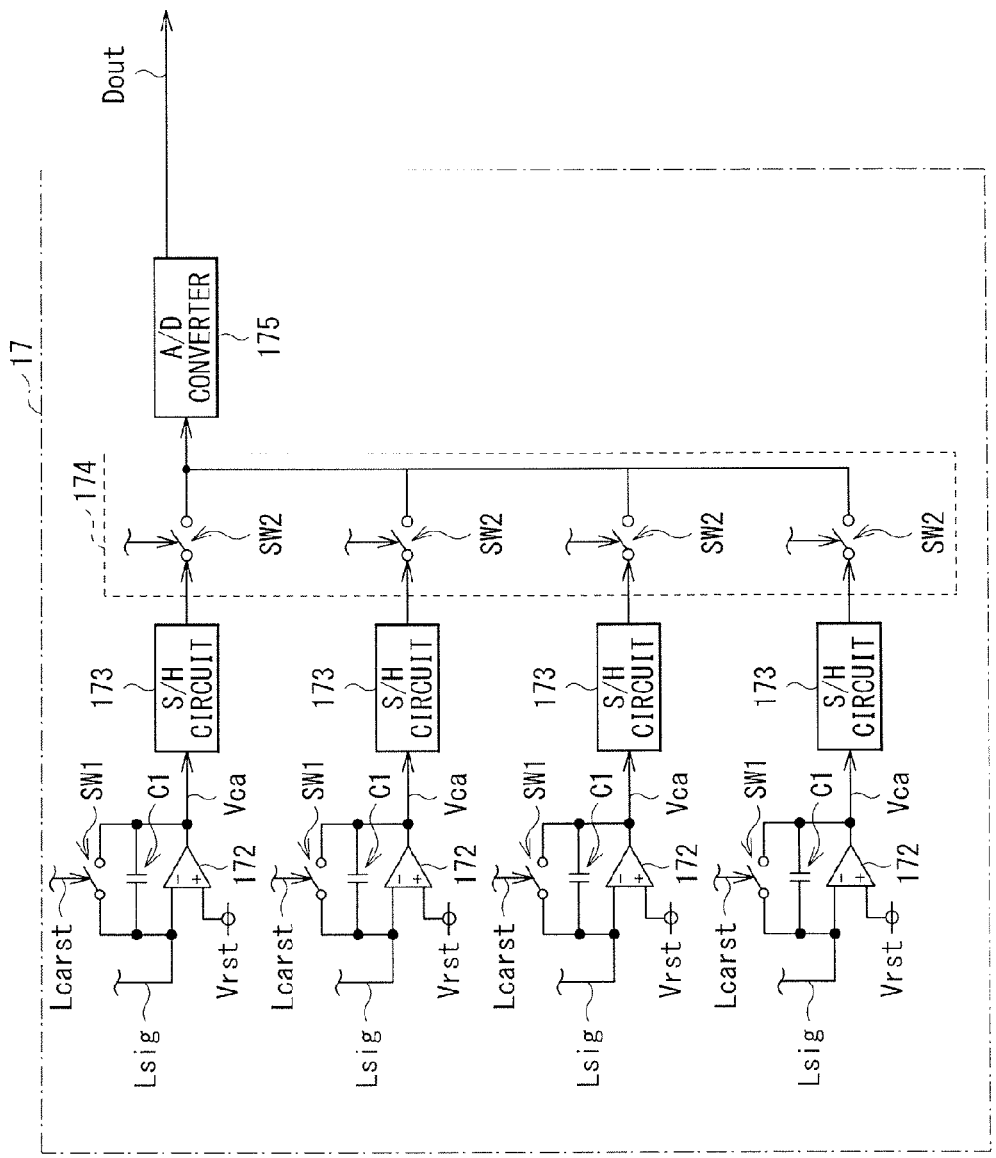
FIG. 4 is a block diagram illustrating one detailed configuration example of a column selection section illustrated in FIG. 1.

Each of the column selection sections 17 may include a charge amplifier 172, a capacitor element (for example, a capacitor and/or a feedback capacitor and so forth) C1, a switch SW1, a sample/hold (S/H) circuit 173, a multiplexer circuit (a selection circuit) 174 including four switches SW2, and an A/D converter 175, for example, as illustrated in FIG. 3 and FIG. 4. In the above-mentioned constitutional elements, the charge amplifier 172, the capacitor element C1, the switch SW1, the S/H circuit 173, and the switch SW2 are provided for every signal line Lsig. The multiplexer circuit 174 and the A/D converter 175 are provided for every column selection section 17.

The charge amplifier 172 is an amplifier adapted to convert (Q-V convert) the signal charge read out of the signal line Lsig into a voltage. The charge amplifier 172 is configured such that one end of the signal line Lsig is connected to a negative side (−side) input terminal thereof and a predetermined reset voltage Vrst is input into a positive side (+side) input terminal thereof. An output terminal of the charge amplifier 172 is feedback-connected to the negative side input terminal thereof via a parallel connection circuit configured by the capacitor element C1 and the switch SW1. That is, one terminal of the capacitor element C1 is connected to the negative side input terminal of the charge amplifier 172 and the other terminal of the capacitor element C1 is connected to the output terminal of the charge amplifier 172. Likewise, one terminal of the switch SW1 is connected to the negative side input terminal of the charge amplifier 172 and the other terminal of the switch SW1 is connected to the output terminal of the charge amplifier 172. It is to be noted that the open/close state (an ON/OFF operation) of the switch SW1 is controlled with a control signal (an amplifier reset control signal) that is supplied from the system control section 16 via an amplifier reset control line Lcarst.

The S/H circuit 173 is a circuit that is arranged between the charge amplifier 172 and the multiplexer circuit 174 (the switch SW2) and adapted to temporarily hold an output voltage Vca from the charge amplifier 172.

The multiplexer circuit 174 is a circuit configured such that the four switches SW2 sequentially enter the ON states one after another in accordance with scan driving by the column scanning section 15 to selectively connect or disconnect each S/H circuit 173 with or from each A/D converter 175.

The A/D converter 175 is a circuit adapted to generate and output the above-mentioned output data Dout by performing A/D conversion on the output voltage that has been input via the switch SW2 from the S/H circuit 173.

(Column Scanning Section 15)

The column scanning section 15 may include, for example, not illustrated shift register circuit, address decoder and so forth so as to drive in order the respective switches SW2 in the above-mentioned column selection section 17 while scanning the switches SW2. The signals (the above-mentioned output data Dout) that have been read out of the respective pixels 20 via the respective signal lines Lsig by selective scanning by the column scanning section 15 so configured are output to the outside in order.

(System Control Section 16)

The system control section 16 is adapted to control operations of the row scanning section 13 (including the later described switch control circuit 33), the A/D conversion section 14, and the column scanning section 15. Specifically, the system control section 16 includes a timing generator adapted to generate the aforementioned various timing signals (the control signals) so as to control driving of the row scanning section 13, the A/D conversion section 14, and the column scanning section 15 on the basis of the various timing signals generated by the timing generator. The row scanning section 13, the A/D conversion section 14, and the column scanning section 15 perform image pickup driving (line sequential image pickup driving) on the plurality of pixels 20 within the pixel section 11 on the basis of the control by the system control section 16, thereby obtaining the output data Dout from the image pickup device 1.

Figure 5:
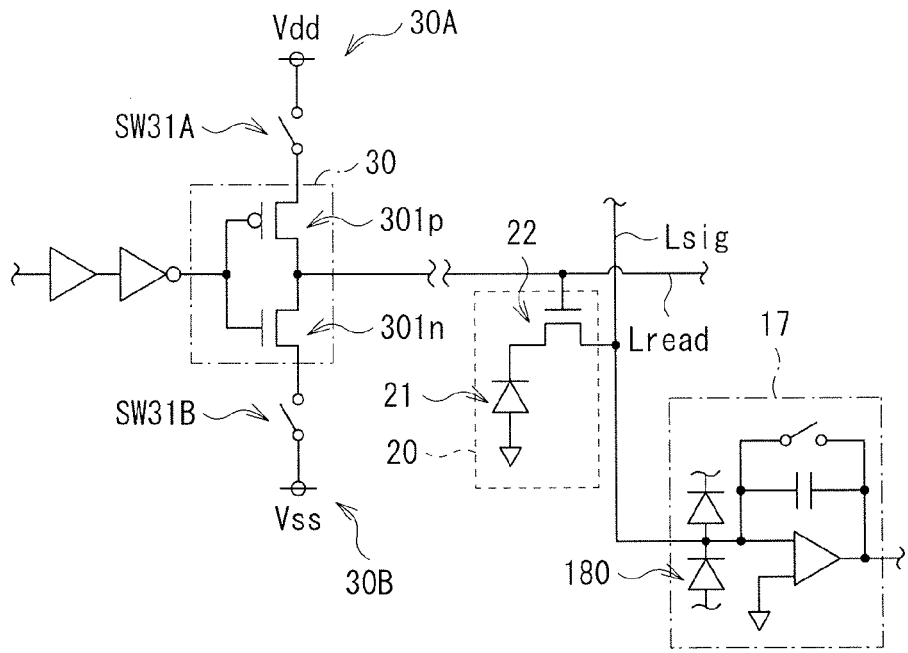
FIG. 5 is a circuit diagram illustrating one configuration example of main parts of a row scanning section, the pixel section, and the column selection section illustrated in FIG. 1.
Figure 6:
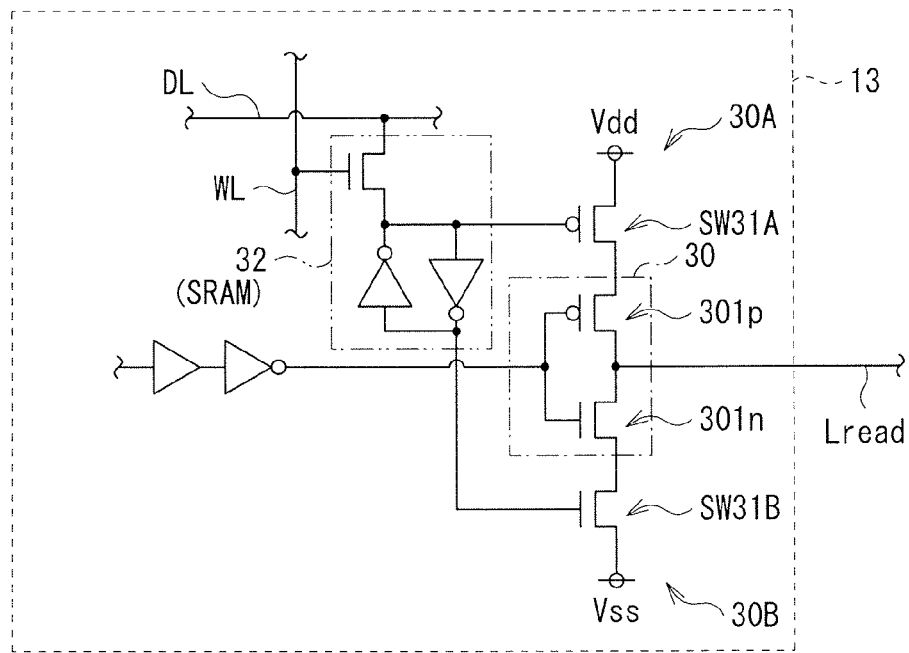
FIG. 6 is a circuit diagram illustrating one detailed configuration example of the row scanning section illustrated in FIG. 5.

FIG. 5 and FIG. 6 are diagrams each illustrating one configuration example of main parts of the above-mentioned row scanning section 13, pixel 20, and column selection section 17. Each of the read-out control lines Lread is connected to the buffer circuit 30 in the row scanning section 13 (the buffer circuit 30 is provided for every read-out control line Lread) as illustrated in FIG. 5.

The buffer circuit 30 is a circuit adapted to current-amplify the row scanning signal (a voltage pulse) and output the signal to the read-out control line Lread. The buffer circuit 30 includes a CMOS (Complementary Metal Oxide Semiconductor) circuit, i.e., includes an n-channel type transistor 301n and a p-channel type transistor 301p. A gate of each of the transistors 301n and 301p is connected to a shift register circuit (not illustrated) adapted to drive the read-out control line Lread via a predetermined logic circuit. In the transistors 301n and 301p, one-side terminals, that is, sources or drains thereof are mutually connected and a negative side power source 30B that serves as a low voltage source Vss is connected to the other-side terminal (the source or the drain) of the transistor 301n. A positive side power source 30A that serves as a high voltage source Vdd is connected to the other-side terminal (the source or the drain) of the transistor 301p.

In the present embodiment, switching elements (switches SW31A and SW31B) are disposed between the power sources (the positive side power source 30A and the negative side power source 30B) of the buffer circuits 30 and the read-out control lines Lread. Specifically, the switch SW31A is disposed between the transistor 301p and the positive side power source 30A of the buffer circuit 30 and the switch SW31B is disposed between the transistor 301n and the negative side power source 30B of the buffer circuit 30. It is to be noted that the switches SW31A and SW31B correspond to one specific example of a "second switching element" in one embodiment of the present disclosure.

Each of the switches SW31A and SW31B may be configured by, for example, an n-channel type transistor and/or a p-channel type transistor. Here, the switch SW31A is configured by the p-channel type transistor and the switch SW31B is configured by the n-channel type transistor, as illustrated in FIG. 6.

Figure 7:
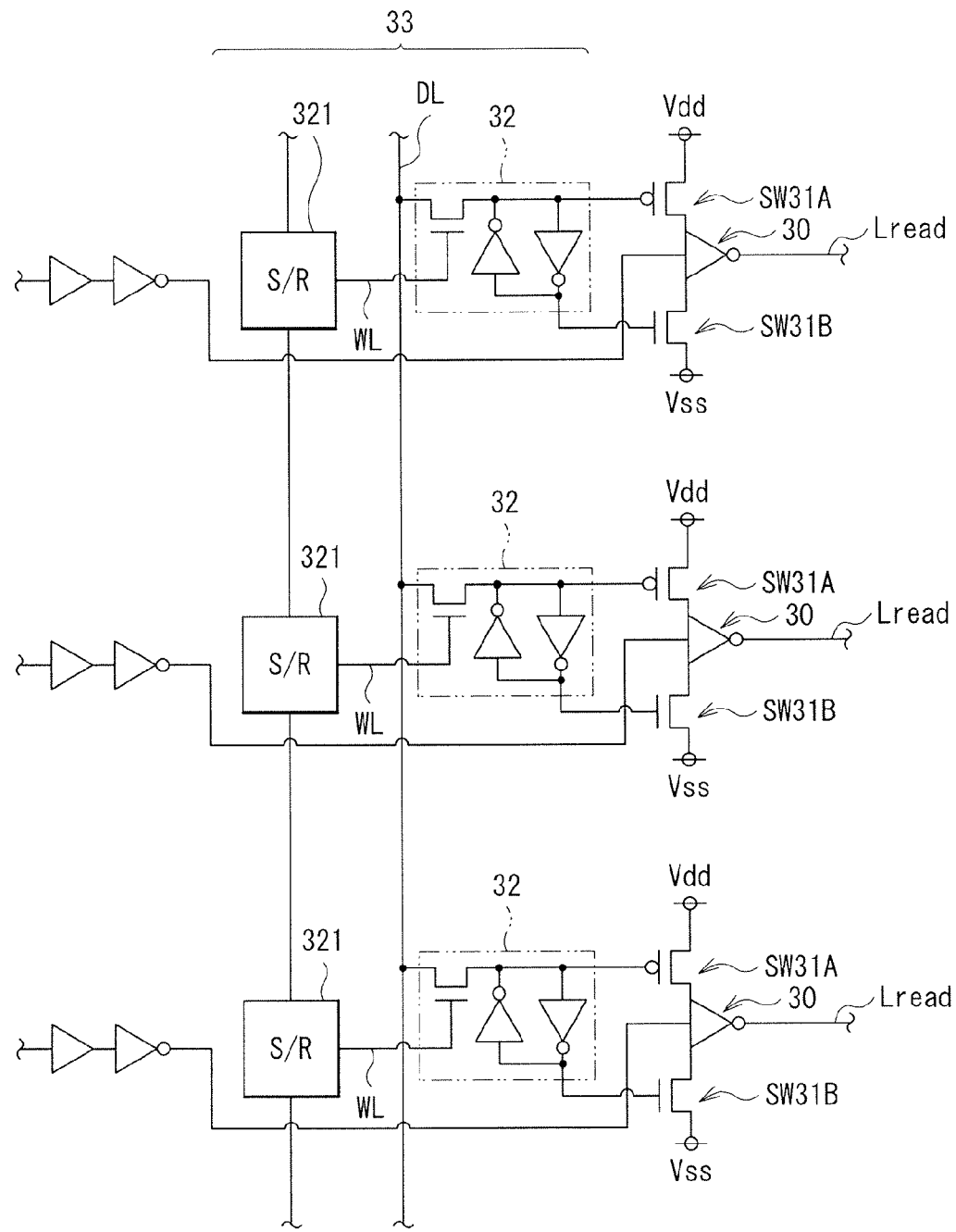
FIG. 7 is a circuit diagram illustrating one detailed configuration example of a switch control circuit illustrated in FIG. 6.

The switches SW31A and SW31B are provided for all of the read-out control lines Lread. That is, one switch SW31A and one switch SW31B are provided for one read-out control line Lread together with one buffer circuit 30. In addition, the open and closed states of the switches SW31A and SW31B are made controllable for every read-out control line Lread. Specifically, although details will be described later, in image pickup driving, both of the switches SW31A and SW31B that are provided corresponding to the normal (not including an electrically short-circuited part (hereinafter, simply referred to as a short-circuited part)) read-out control line Lread in all of the read-out control lines Lread are controlled to be in the closed states. On the other hand, both of the switches SW31A and SW31B that are provided corresponding to the read-out control line Lread including the short-circuited part (a defect holding line Lx) are controlled to be in the open states. The open/close states of the switches SW31A and SW31B are controlled by the switch control circuit 33 (FIG. 7).

The switch control circuit 33 is adapted to perform open/close control (ON/OFF driving) on the switches SW31A and SW31B on the basis of the control by the system control section 16 for every read-out control line Lread. The switch control circuit 33 may include, for example, a semiconductor memory element 32 and a shift register circuit 321 provided for every read-out control line Lread. A word line WL and a data line (a bit line) DL are connected to each semiconductor memory element 32. Thus, the switch control circuit 33 operates to control the switches SW31A and SW31B to be in the open states or the closed states for every read-out control line Lread by writing data into each semiconductor memory element 32.

The semiconductor memory element 32 may be configured by, for example, a volatile memory element such as an SRAM (Static Random Access Memory) and/or a DRAM (Dynamic Random Access Memory) and so forth and/or a nonvolatile memory element such as a flash memory and so forth. Here, description will be made by taking a case that the semiconductor memory element 32 is configured by the SRAM as an example. The semiconductor memory element 32 (the SRAM) may include two NOT circuits and one transistor that configure, for example, a so-called flip flop and the word line WL is connected to a gate of the transistor. The data line DL may be connected to, for example, a source of the transistor and the switches SW31A and SW31B may be connected to a drain side thereof via the SRAM. Since the semiconductor memory element 32 is so configured, data (later described low-level or high-level data) that has been written by keeping the power source turned on is held still after written in the semiconductor memory element 32. The word line WL may be connected to the shift register circuit 321, for example, for every read-out control line Lread and the data line DL is provided in common among the read-out control lines Lread.

The shift register circuit 321 is a circuit adapted to generate a pulse signal that is sequentially shifted in the V direction on the basis of a start pulse and a clock signal supplied from the system control section 16.

[Functions and Effects]

In the image pickup device 1 according to the present embodiment, when the radiation (for example, X-rays) is incident upon the pixel section 11, the radiation may be wavelength-converted into visible light, for example, through the wavelength conversion layer 112 and is received by the photoelectric conversion element 21 in each pixel 20. In the photoelectric conversion element 21, the signal charges based on a received light amount are generated. Thus, in the accumulation node N, a voltage change according to the node capacity occurs by accumulation of the signal charges generated by photoelectric conversion. Specifically, assuming that Cs is an accumulation node capacity and q is a generated signal charge, a voltage will be changed (here, reduced) by the mount of (q/Cs) in the accumulation node N and therefore the signal Vin corresponding to the signal charge is supplied to the drain of the transistor 22. The signal charge (the signal Vin) is read out from each pixel 20 into the signal line Lsig by bringing the transistor 22 into the ON state in accordance with the row scanning signal supplied from the read-out control line Lread.

The read-out signal charges is input into the column selection section 17 in the A/D conversion section 14 in units of plural (here, four) pixel columns via the signal lines Lsig. In the column selection section 17, first, Q-V conversion (conversion from the signal charge into a signal voltage) is performed by a charge amplifier circuit configured by the charge amplifier 172 and so forth on each signal charge that is input through each signal line Lsig. Then, A/D conversion is performed on each converted signal voltage (the output voltage Vca from the charge amplifier 172) by the A/D converter 175 via the S/H circuit 173 and the multiplexer circuit 174 to generate the output data Dout (the image pickup signal) configured by the digital signal. Pieces of the output data Dout are output in order from the respective column selection sections 17 and are transmitted to the outside (or input into a not illustrated internal memory) in this way.

Figure 8A:
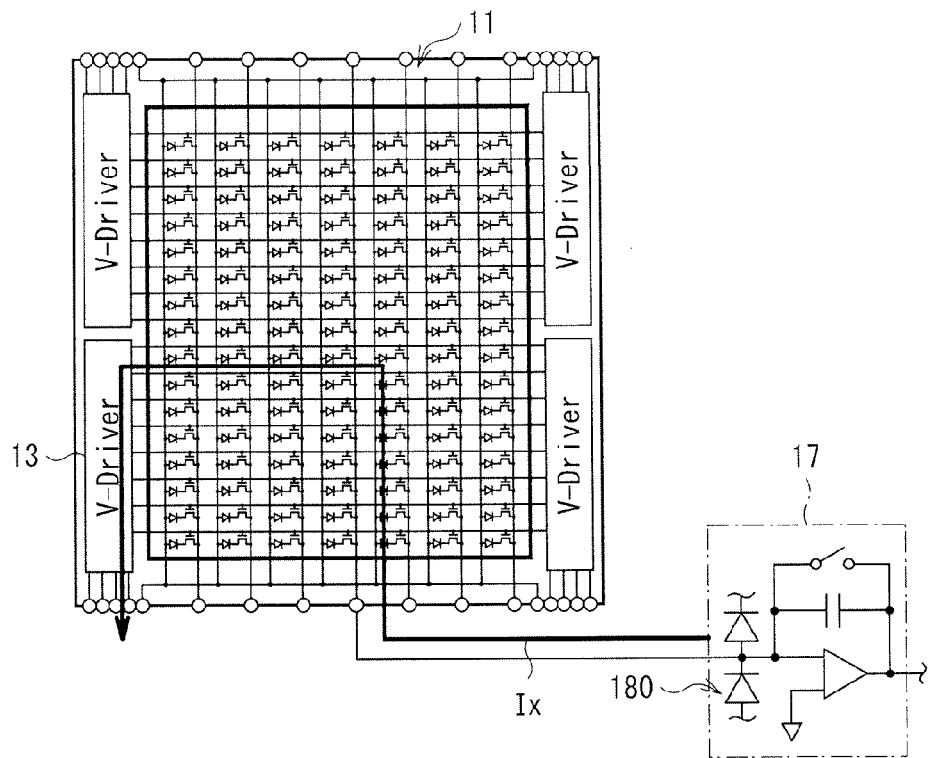
FIG. 8A is a schematic diagram illustrating one example of an adverse effect caused by an electric short-circuit between a read-out control line and a signal line.
Figure 8B:
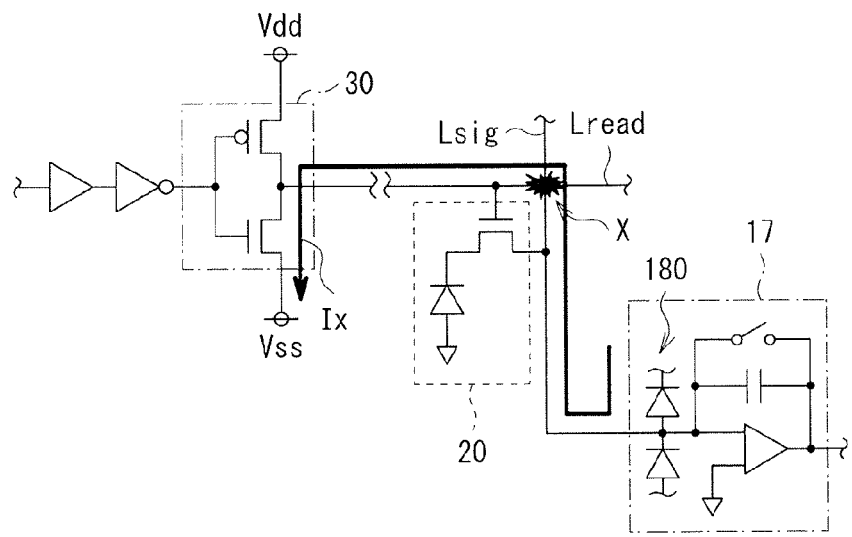
FIG. 8B is a schematic diagram illustrating another example of the adverse effect caused by the electric short-circuit between the read-out control line and the signal line.

Here, in the image pickup device 1 as mentioned above, for example, in a manufacturing process, the read-out control line Lread may be sometimes electrically short-circuited by being adversely affected by attachment of a foreign substance such as dust and so forth, a pattern defect and so forth. Specifically, the read-out control line Lread and the signal line Lsig may be sometimes short-circuited to each other, for example, at an intersection part (a short-circuited part X in FIG. 8B) of these lines. When the short-circuited part X as mentioned above is generated, the negative voltage (Vss) of the read-out control line Lread may be input into, for example, the column selection section 17 (through the signal line Lsig), an overcurrent (a current Ix in FIG. 8A and FIG. 8B) may flow into a protection diode 180 formed within the column selection section 17, and a so-called line defect failure may be induced. In addition, the adverse effect reaches up to wirings around the read-out control line Lread not only to the read-out control line Lread that includes the short-circuited part X and as a result, a multiple defect is induced. When such a line defect occurs, a dark line (or a bright line) is linearly generated on the acquired image and therefore the image quality is degraded.

Therefore, in the present embodiment, the switches SW31A and SW31B that are disposed between the read-out control line Lread (the defect holding line Lx) including the short-circuited part relative to the signal line Lsig and the power source of the buffer circuit 30 of the defect holding line Lx are controlled to be in the open states in image pickup driving as described above. On the other hand, the switches SW31A and SW31B that are disposed between the normal read-out control line Lread and the power source of the buffer circuit 30 of the normal read-out control line Lread are controlled to be in the closed states. The switches SW31A and SW31B are disposed at predetermined positions relative to each read-out control line Lread and the open/close states of the switches SW31A and SW31B are controlled for every read-out control line Lread depending on presence/absence of the electric short-circuit as described above. Specifically, the defect holding line Lx is detected and the open/close states of the switches SW31A and SW31B are set and controlled in the following manner.

Figure 9:
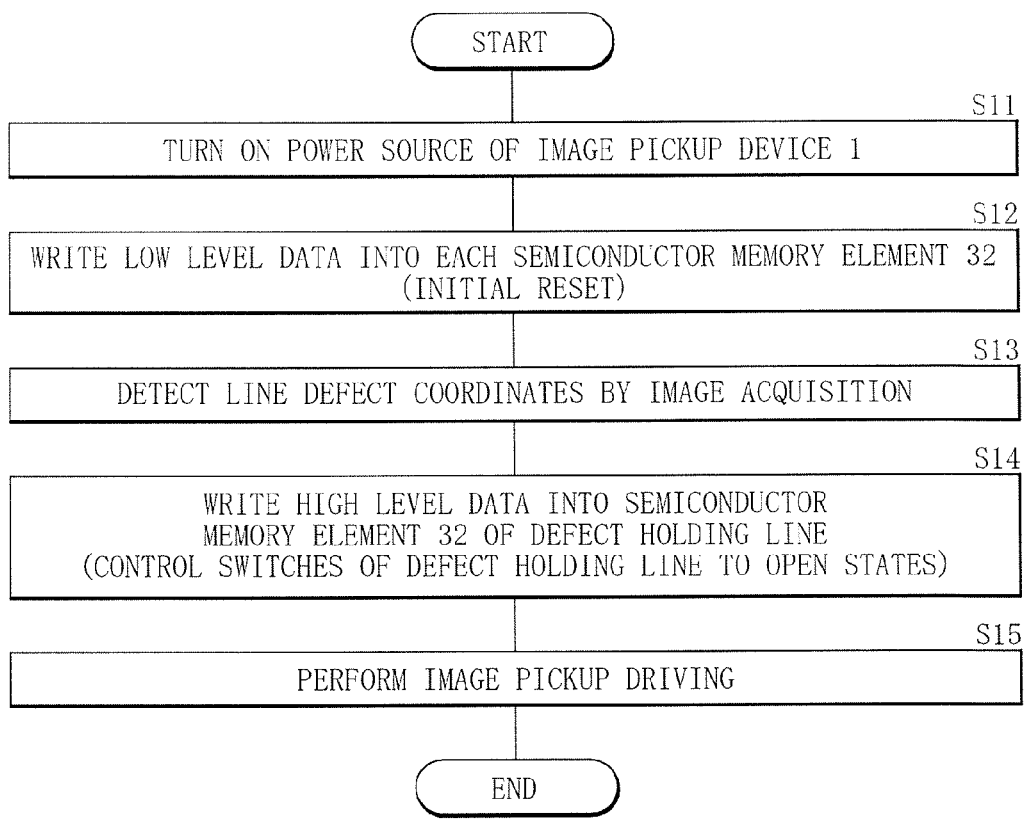
FIG. 9 is a flowchart illustrating one example of a flow of respective processing operations to be performed before image pickup driving.

FIG. 9 is a diagram illustrating one example of a flow up to the image pickup driving operation after the power source of the image pickup device 1 of the present embodiment has been turned on. First, after the power source of the image pickup device 1 has been turned on (step S11) in this way, low level voltage data (corresponding to one specific example of "second data" in one embodiment of the present disclosure) is written into each semiconductor memory element 32 as an initial resetting operation (step S12).

Figure 10A:
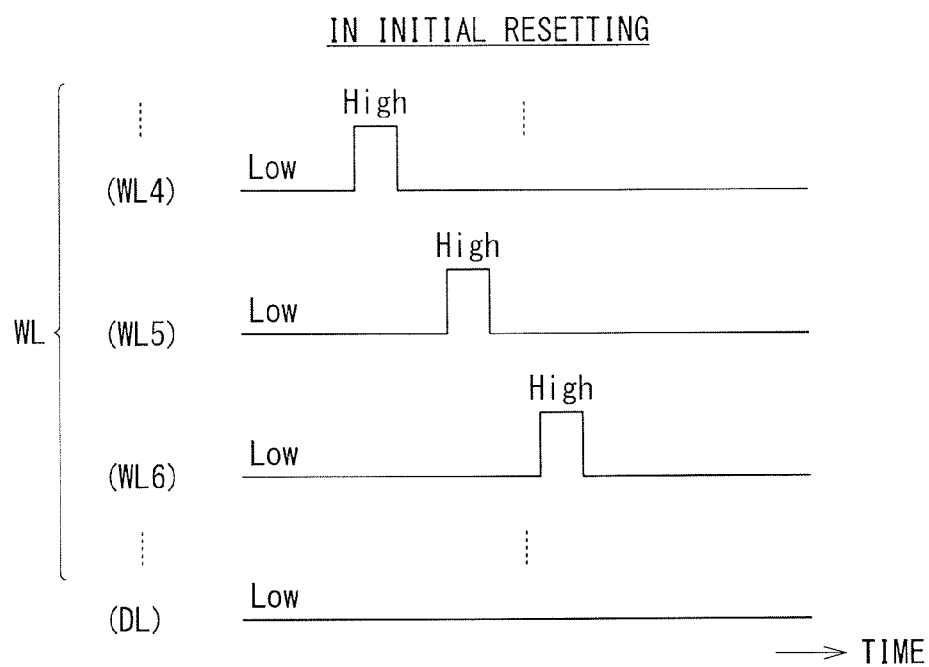
FIG. 10A is a timing chart illustrating one example of respective voltages to be applied to a word line and a data line in initial resetting.

Specifically, pulse signals that sequentially reach high levels are applied to the word lines WL (WL1, WL2, WL3, WL4, . . . ) as illustrated in FIG. 10A, thereby writing the voltage data (the low level) of the data line DL into the respective semiconductor memory elements 32 line-sequentially. It is to be noted that in the plurality of word lines WL, only the word lines WL4 to WL6 that are arrayed as the fourth line to the sixth line counted from top are illustrated in FIG. 10A. The same also applies to the following drawings.

Figure 10B:
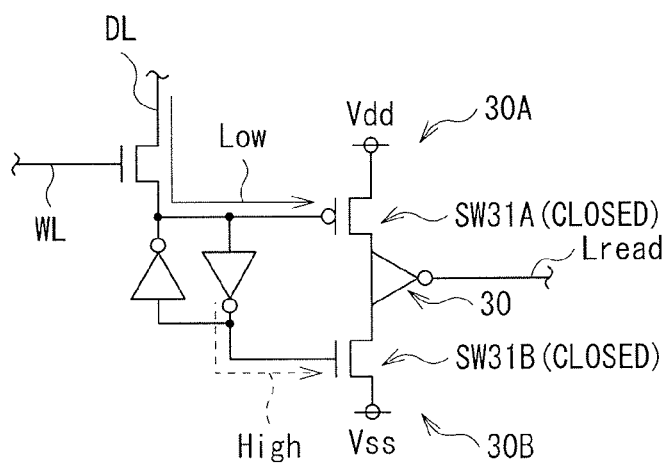
FIG. 10B is a schematic diagram illustrating one example of a switch open/close controlling operation in initial resetting.

Thus, the voltage corresponding to the low level is supplied to the switch SW31A and the voltage corresponding to the high level is supplied to the switch SW31B as illustrated in FIG. 10B. As a result, both of the switches SW31A and SW31B are controlled to be in the closed states (the ON states) and all of the read-out control lines Lread reach states that they have been connected to the negative side power source 30B or the positive side power source 30A via the buffer circuits 30.

Then, the image (the output data Dout) is acquired to detect the defect holding line Lx (line defect coordinates) in a state that both of the switches SW31A and SW31B have been controlled to be in the closed states in each read-out control line Lread (step S13).

Figure 11:
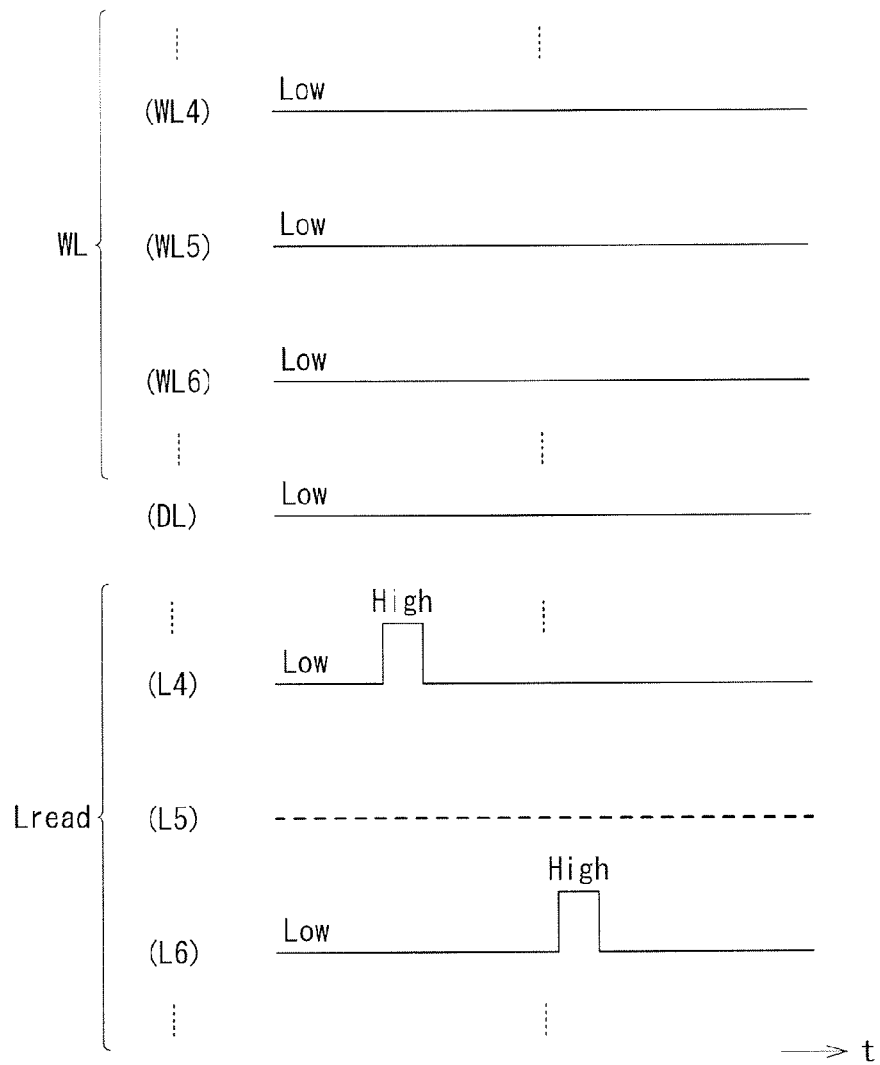
FIG. 11 is a timing chart illustrating one example of respective voltages to be applied to the word line, the data line, and the read-out control line in defect detection.

Specifically, signal read-out driving is performed while maintaining the above-mentioned switches SW31A and SW31B in the closed states (so as to avoid rewriting of the data in the semiconductor memory element 32) by applying the low level voltage to the word line WL as illustrated in FIG. 11. That is, the signal charges accumulated in the respective pixels 20 are read out into the signal lines Lsig line-sequentially by applying the pulse signals that sequentially reach high levels to the read-out control lines Lread (L1, L2, L3, L4, . . . ). Here, it is assumed that a read-out control line Lm (m=1, 2, 3, . . . ) is provided corresponding to a word line Lm, that is, a word line WL4 is connected to the semiconductor memory element 32 of the read-out control line L4 and a word line WL5 is connected to the semiconductor memory element 32 of a read-out control line L5.

When the electric short-circuit is occurring in the read-out control line L5 included in the read-out control lines Lread in the above-mentioned situation, the voltage to be applied to the read-out control line L5 (that is, the defect holding line Lx) is drawn by the voltage of the wiring (the signal line Lsig) that is being short-circuited and exhibits a complicated waveform (illustrated by a broken line in FIG. 11 for convenience). On the other hand, voltages that sequentially correspond to the high levels (that is, the ON voltages of the transistors 22) are applied to other normal read-out control lines Lread (for example, the read-out control lines L4, L6 and so forth). Thus, the transistor 22 enters the ON state in each pixel 20 connected to each normal read-out control line Lread and the signal charge accumulated therein is read out into each signal line Lsig. As a result, the pixel line (the pixels 20 in the fifth row counted from top) corresponding to the read-out control line L5 is detected as the line defect coordinates on the acquired image.

Then, the switches SW31A and SW31B that are provided corresponding to the defect holding line Lx (the read-out control line L5) that has been detected in the above-mentioned manner are selectively controlled to be in the open states (step S14).

Figure 12A:
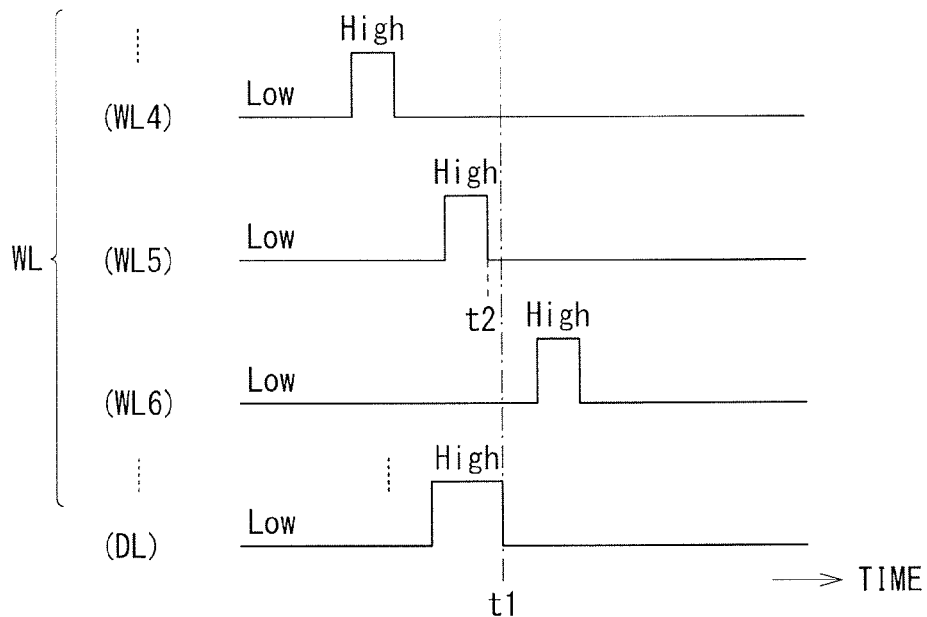
FIG. 12A is a timing chart illustrating one example of respective voltages to be applied to the word line and the data line in a switch opening operation performed so as to cope with a defect holding line.

Specifically, the pulse signals that sequentially reach the high levels are applied to the word lines WL as illustrated in FIG. 12A. On the other hand, the high level data is written into the data line DL in almost synchronization with a timing that the signal in the word line WL5 corresponding to the defect holding line Lx (the read-out control line L5) reaches the high level. At that time, it is preferable that a timing t1 that the signal level is switched from the high level to the low level in the data line DL be set to come after a timing t2 that the signal level is switched from the high level to the low level in the word line WL5, because it is possible to suppress writing of the low level data of the data line DL when the pulse signal to be supplied to the word line WL is delayed.

Figure 12B:
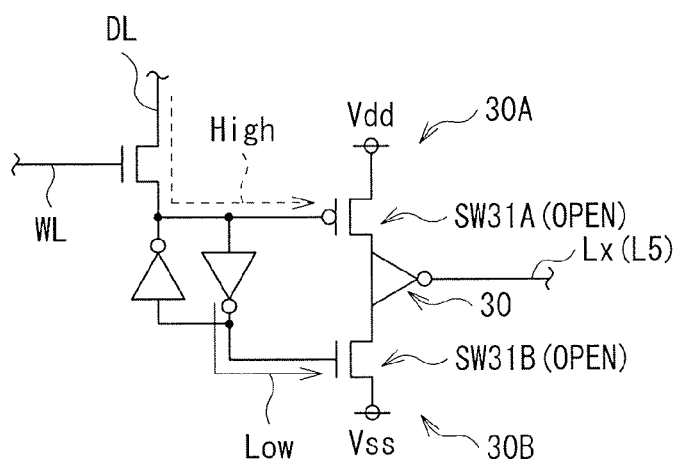
FIG. 12B is a schematic diagram illustrating one example of the switch opening operation performed so as to cope with the defect holding line.

Accordingly, the high level data is selectively written into only the semiconductor memory element 32 corresponding to the defect holding line Lx (the read-out control line L5) as illustrated in FIG. 12B. Thus, the voltage corresponding to the high level data is supplied to the switch SW31A and the voltage corresponding to the low level data is supplied to the switch SW31B. As a result, both of the switches SW31A and SW31B are controlled to be in the open states (the OFF states) and the defect holding line Lx (the read-out control line L5) is brought into a non-connected state relative to the negative side power source 30B and the positive side power source 30A. On the other hand, since the low level data is written into the semiconductor memory elements 32 that correspond to the respective read-out control lines Lread ( . . . , L3, L4, L6, . . . ) other than the defect holding line Lx (the read-out control line L5), both of the switches SW31A and SW31B corresponding to these read-out control lines Lread are controlled to (held in) be in the closed states (the ON states).

It is possible to continuously maintain thereafter the open/closed states of the switches SW31A and SW31B that have been controlled for every read-out control line Lread in this way. However, since the line defect may sometimes occur for some reason still after shipment of the device as a product, the respective operations in step S11 to step S14 may be performed again so as to detect the new line defect and the open/close states of the switches SW31A and SW31B of each read-out control line Lread may be reset in such a case.

Figure 13:
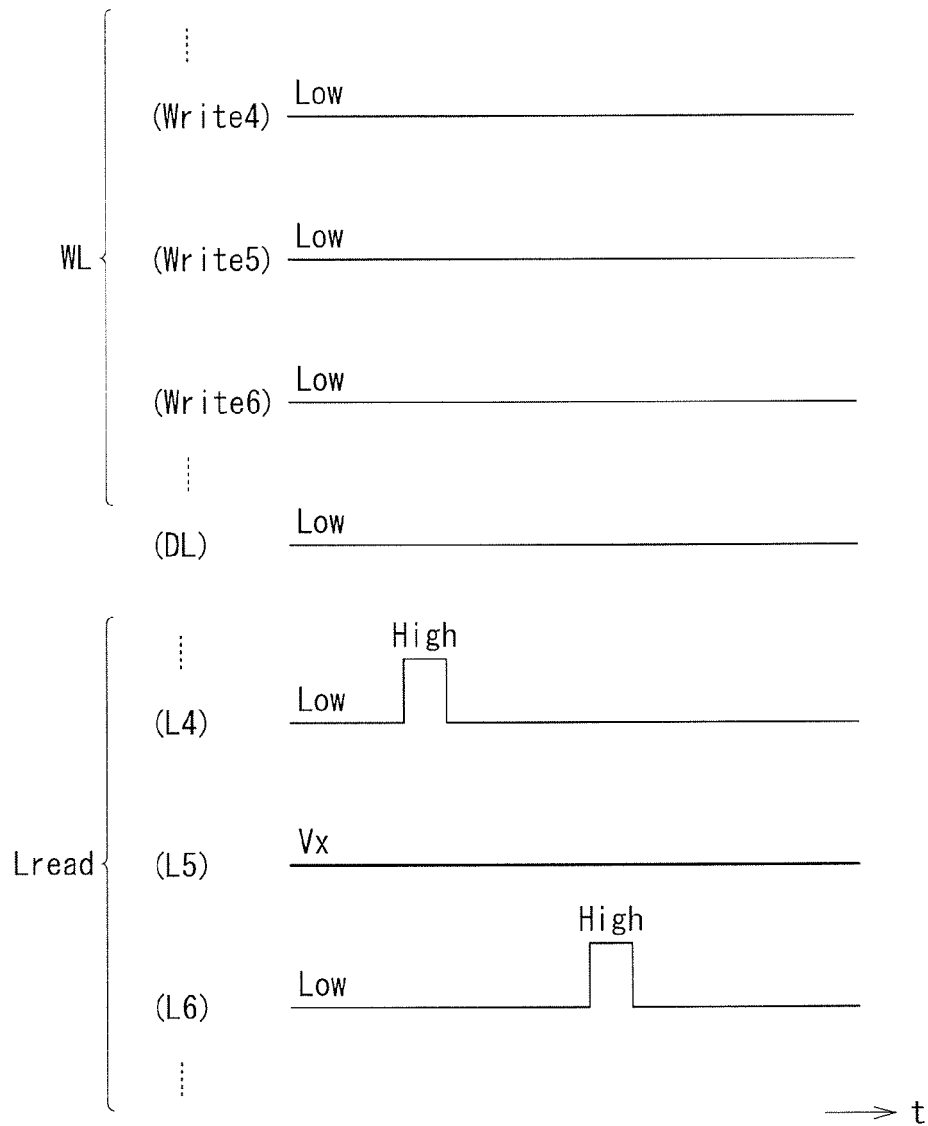
FIG. 13 is a timing chart illustrating one example of respective voltages to be applied to the word line, the data line, and the read-out control line in image pickup driving.

Image pickup driving is performed after open/close control has been performed on the switches SW31A and SW31B as mentioned above (step S15). At that time, the low level voltages are applied to both of the word lines WL and the data line DL as illustrated in FIG. 13 and signal read-out driving is performed while maintaining the open/closed states of the above-mentioned switches SW31A and SW31B (so as to avoid rewriting of the data in the semiconductor memory element 32). That is, the signal charges accumulated in the respective pixels 20 are line-sequentially read out into the signal lines Lsig by applying the pulse signals that sequentially reach the high levels to the read-out control lines Lread.

Figure 14A:
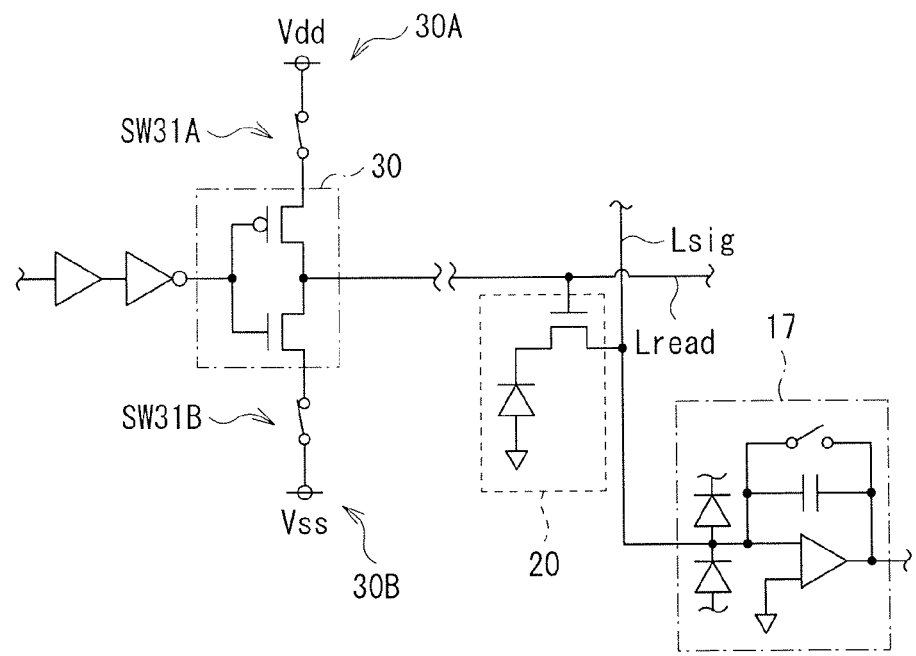
FIG. 14A is a circuit diagram illustrating one example of a control state (a closed state) of a switching element that is provided corresponding to a normal read-out control line.
Figure 14B:
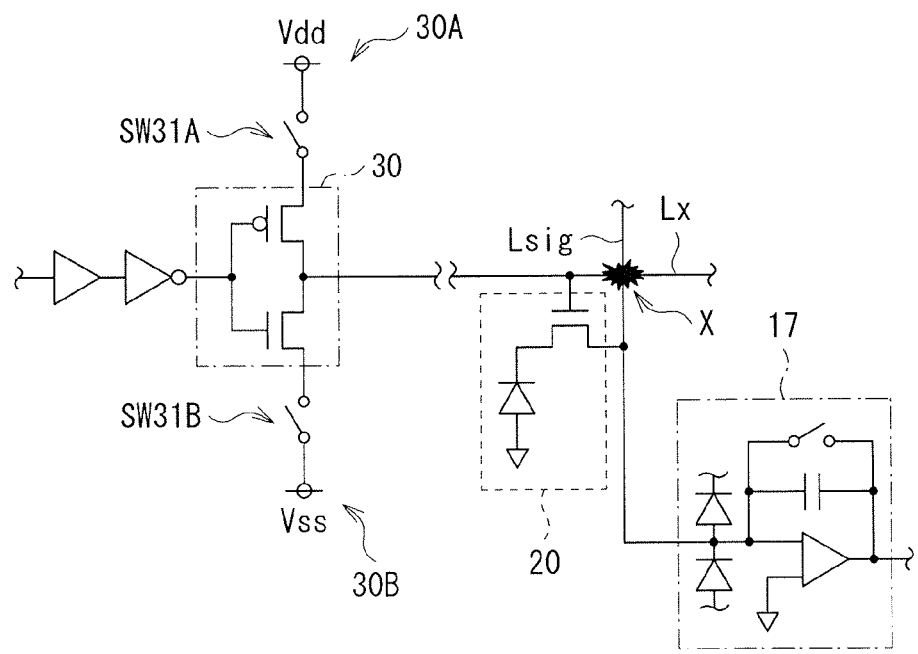
FIG. 14B is a circuit diagram illustrating one example of a control state (an open state) of the switching element that is provided corresponding to the defect holding line.

At that time, in the normal read-out control lines Lread (for example, the read-out control lines L4, L6 and so forth), the switches SW31A and SW31B are being controlled to be in the closed states as illustrated in FIG. 14A. Therefore, the voltages (that is, the ON voltages of the transistors 22) that sequentially correspond to the high levels are applied to the read-out control lines L4, L6 and so forth as illustrated in FIG. 13. Accordingly, the transistors 22 are controlled to the ON states and the signal charges are read out of the pixels 20 into the signal lines Lsig. On the other hand, in the defect holding line Lx (the read-out control line L5), the switches SW31A and SW31B are being controlled to be in the open states as illustrated in FIG. 14B. Therefore, the voltage of the defect holding line Lx (the read-out control line L5) does not reach the high level and defect holding line Lx may enter a state that, for example, a fixed DC voltage Vx has been applied as illustrated in FIG. 13.

Accordingly, a fluctuation in signal voltage caused by the defect holding line Lx is suppressed, generation of an overcurrent Ix (FIG. 8A and FIG. 8B) is suppressed and the line defect failure is suppressed. In addition, reaching of the adverse effect up to the wirings (for example, the read-out control lines L4, L6 and so forth that are adjacent to the defect holding line Lx) around the defect holding line Lx is suppressed (the multiple defect is suppressed).

In addition, in the finally acquired image data (the output data Dout), it is possible to readily interpolate images included in the line data corresponding to the defect holding line Lx from the adjacent line data (for example, the line data and so forth corresponding to the read-out control lines L4 and L6 in the above-mentioned example). Here, although it is desired to interpolate the plurality of pieces of line data when such a multiple defect as mentioned above has occurred, when the number of lines to be interpolated is increased, image interpolation becomes difficult (interpolation accuracy may be reduced). Therefore, it becomes possible to suppress degradation of the image quality by minimizing the adverse effect caused by the short-circuited part by detecting in advance the defect holding line Lx that includes the short-circuited part and controlling such that the ON voltage or the OFF voltage is not applied as in the present embodiment.

In the present embodiment, the switches SW31A and SW31B are disposed respectively between each of the plurality of the read-out control lines Lread provided to perform ON/OFF control of the transistors 22 in the respective pixels 20 and the power source (the positive side power source 30A) of each buffer circuit 30 of each read-out control line Lread and between each of the read-out control lines Lread and the power source (the negative side power source 30B) of each buffer circuit 30 of each read-out control line Lread as described above. In image pickup driving, the switches SW31A and the SW31B that are disposed respectively between the defect holding line Lx in the plurality of read-out control lines Lread and the power source 30A of the buffer circuit 30 thereof and between the defect holding line Lx and the power source 30B of the buffer circuit 30 thereof are controlled to be in the open states and other switches SW31A and SW31B are controlled to be in the closed states. It becomes possible to suppress occurrence of the line defect failure and the multiple detect by performing signal reading while maintaining the so controlled states of the respective switches. Accordingly, it is possible to suppress degradation of the image quality of the picked-up image.

In addition, it is possible to detect the defect holding line Lx that includes the short-circuited part X nondestructively and to electrically block the defect holding line Lx. Although a technique by laser repair is used in general as a countermeasure for the line defect, wirings and so forth arranged in a repair region may sometimes corrode due to deliquescency of the wavelength conversion layer 112 (the scintillator) formed on the light receiving surface side of the pixel section 11 in this case. In the present embodiment, since electric block of the defect is possible by controlling the switches, it is also possible to avoid occurrence of such corrosion. In addition, there is also such an advantage that since it is allowed not to perform a laser repairing process, manufacturing tact is improved.

It is to be noted that in general, in wiring pattern inspection, there may be used a technique of detecting an abnormal location by using a system that for example, a wiring pattern is photographed while automatically moving a microscope to output an image and software programmed so as to recognize an abnormal pattern from the photographed image. It is also possible for the present embodiment to address such a situation that the short-circuited part X detection of which is difficult even when such a technique is used is included.

In the following, modification examples of the above-mentioned embodiment will be described. The same numerals are assigned to the same constitutional elements as those in the above-mentioned embodiment and description thereof will be omitted.

<Modification Example 1>

Figure 15:
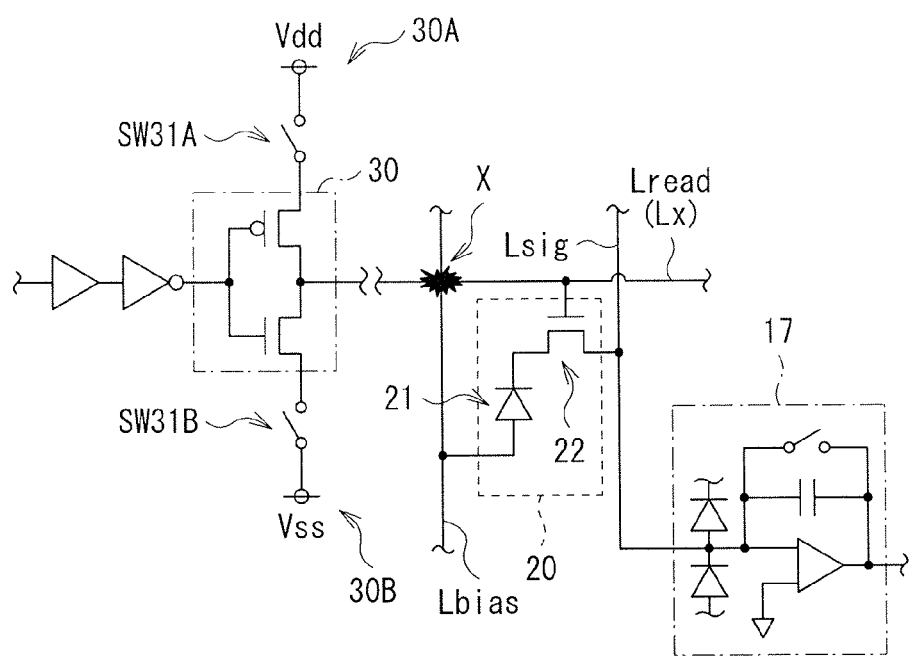
FIG. 15 is a circuit diagram illustrating one configuration example of main parts of the row scanning section, the pixel section, and the column selection section according to a modification example 1.

FIG. 15 is a circuit diagram illustrating one configuration example of main parts of the row scanning section 13, the pixel 20, and the column selection section 17 according to the modification example 1. Although in the above-mentioned embodiment, a case that the short-circuited part X of the read-out control line Lread is generated at the intersection part between the short-circuited part X and the signal line Lsig has been described by way of example, there are cases where the short-circuited part X is generated between the short-circuited part X and the wiring other than the signal line Lsig. In the present modification example, an example of a case that the short-circuited part X is generated at an intersection part between the short-circuited part X and a bias line (a fixed potential line) Lbias that is to be connected to the photoelectric conversion element 21 of the pixel 20 will be described.

Each of the switches SW31A and SW31B is disposed between the read-out control line Lread (the defect holding line Lx) that includes the short-circuited part X and the power source (the positive side power source 30A or the negative side power source 30B) of the buffer circuit 30 also in the present modification example. In addition, control of the switches SW31A and SW31B is performed by the switch control circuit 33 that includes the semiconductor memory element 32 (the SRAM). Further, it is possible to detect the defect holding line Lx and to set and control the open/close states of the switches SW31A and SW31B for every read-out control line Lread in the same way as in the above-mentioned embodiment. Then, the multiple defect is suppressed by performing signal reading while controlling both of the switches SW31A and SW31B to be in the open states in the defect holding line Lx and therefore it is possible to obtain effects that are equivalent to those by the above-mentioned embodiment.

Figure 16:
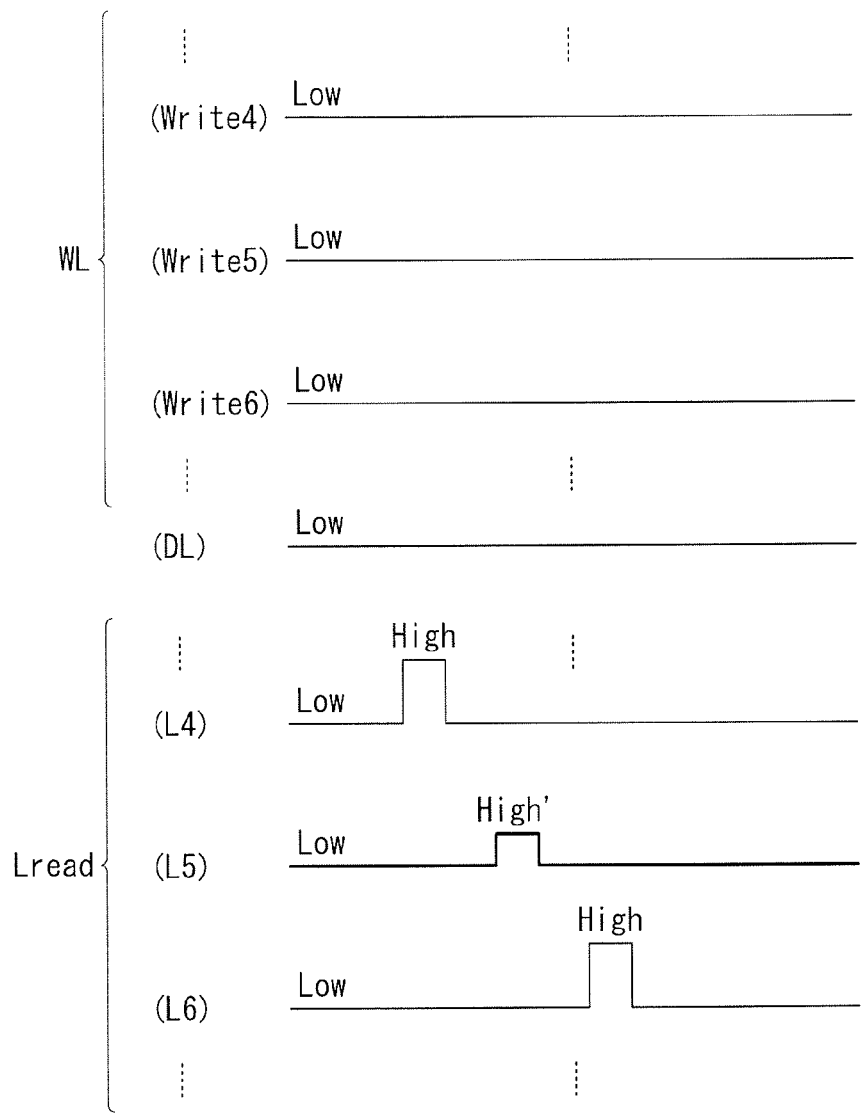
FIG. 16 is a timing chart illustrating one example of respective voltages to be applied to the word line, the data line, and the read-out control line in defect detection (image acquisition) in the case illustrated in FIG. 15.

However, in the present modification example, the waveform of the voltage to be applied to the defect holding line Lx including the short-circuited part X in defect detection performed after the initial resetting operation that is substantially the same as that in the above-mentioned embodiment is made different form that in the case of the above-mentioned embodiment. Specifically, when pulse signals that sequentially reach high levels are applied to all of the read-out control lines Lread in a state that the switches SW31A and the SW31B have been controlled to be in the closed states in defect detection, the voltage to be applied to the read-out control line L5 (the defect holding line Lx) including the short-circuited part X is drawn by the voltage of the short-circuited wiring (the bias line Lbias) and the amplitude thereof is changed as illustrated in FIG. 16. Here, the high level of the voltage is reduced (High'<High) and the amplitude is reduced. As a result, the transistor 22 is not switched to the ON state and the signal charge is not output in the pixel line (the row of the pixels 20 connected to the defect holding line Lx) corresponding to the defect holding line Lx. On the other hand, the voltages (the ON voltages of the transistors 22) that sequentially correspond to the high levels are applied to the other normal read-out control lines Lread and the signal charges are read out of the pixels 20 in the same way as in the above-mentioned embodiment. Accordingly, the pixel line (the fifth row counted from top) corresponding to the read-out control line L5 is detected as the line defect coordinates in the acquired image.

It is to be noted that the short-circuited part X of the defect holding line Lx is not limited to the ones generated between the read-out control line Lread and the signal line Lsig and between the read-out control line Lread and the bias line Lbias as described above and may be the one generated between the read-out control lines Lread and a wiring other than the above. In other words, the short-circuited part X may not necessarily be limited to the one generated at an intersection point between wirings. In either case, since some change occurs in the voltage waveform by performing the defect detecting operation as mentioned above, it is possible to detect the defect holding line Lx.

<Modification Example 2>

Figure 17:
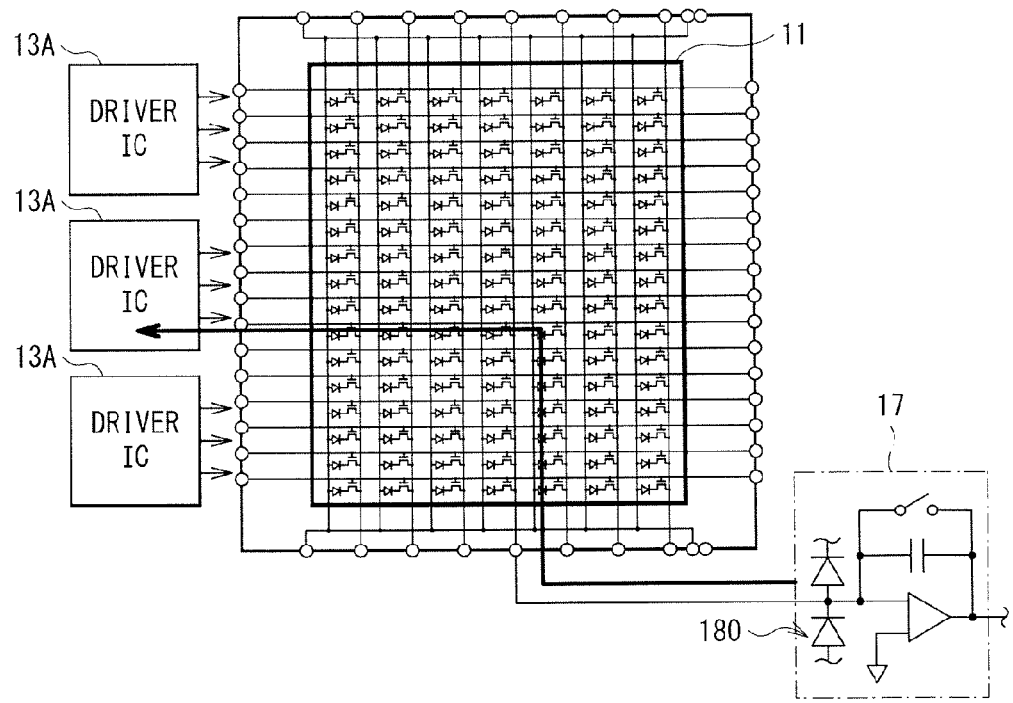
FIG. 17 is a schematic diagram illustrating one general configuration example of an image pickup device according to a modification example 2.

FIG. 17 is a schematic diagram illustrating one general configuration example of an image pickup device according to the modification example 2. Although, in the above-mentioned embodiment, a case that the circuit block that includes the row scanning section 13 (including the buffer circuit 30 and the switch control circuit 33), the column scanning section 15, the system control section 16 and so forth has been formed on the same substrate as the pixel section 11 has been described by way of example, the above-mentioned circuit block may be formed on a substrate that is different from the substrate of the pixel section 11. For example, when the pixel section 11 has been formed by a low mobility device made of amorphous silicon and so forth, since it may be difficult to form the above-mentioned circuit block on the same substrate (made of glass and so forth) as the pixel section 11, the circuit block may be formed on another substrate as a driver IC (Integrated Circuit) 13A and may be connected to the pixel section 11.

<Modification Example 3>

Figure 18:
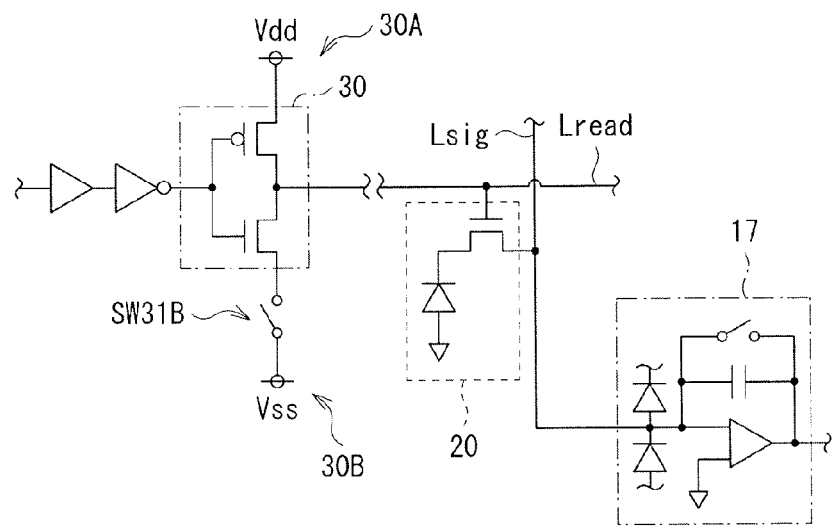
FIG. 18 is a circuit diagram illustrating one configuration example of main parts of the row scanning section, the pixel section, and the column selection section according to a modification example 3.

FIG. 18 is a circuit diagram illustrating one configuration example of main parts of the row scanning section, the pixel section, and the column selection section according to the modification example 3. Although, in the abode-mentioned embodiment, the switches (the switches SW31A and SW31B) have been disposed respectively between the read-out control line Lread and the positive side power source 30A and between the read-out control line Lread and the negative side power source 30B, the switches may not necessarily be disposed on both of the positive and negative power sources sides. In the present modification example, a switch (a switch SW31B) is disposed between the read-out control line Lread and the negative side power source 30B of the buffer circuit 30.

When the transistor 22 of the pixel 20 is of the n-channel type, the voltage to be supplied from the negative side power source 30B via the buffer circuit 30 is applied as the voltage (the OFF voltage) that controls the transistor 22 to the OFF state. Here, the transistor 22 is temporarily controlled to the ON state when the signal charge is to be transferred to the signal line Lsig and is controlled to the OFF state in a period other than the above. That is, the period that the transistor 22 is being controlled to the OFF state is longer than the period that the transistor 22 is being controlled to the ON state. Therefore, when the switch SW31B is to be arranged on either the positive side or the negative side and when the transistor 22 is of the n-channel type, it becomes possible to effectively reduce the adverse effect caused by the line defect by disposing the switch SW31B on the negative side power source 30B side. It is to be noted that the switch may be disposed only on the positive side power source 30A side for any other purpose not limited to the above. However, it is desirable to dispose the switches SW31A and SW31B on both of the positive side power source 30A side and the negative side power source 30B side as described in the above-mentioned embodiment in order to suppress the line defect and the multiple detect.

<Modification Examples 4-1 and 4-2>

Figure 19A:
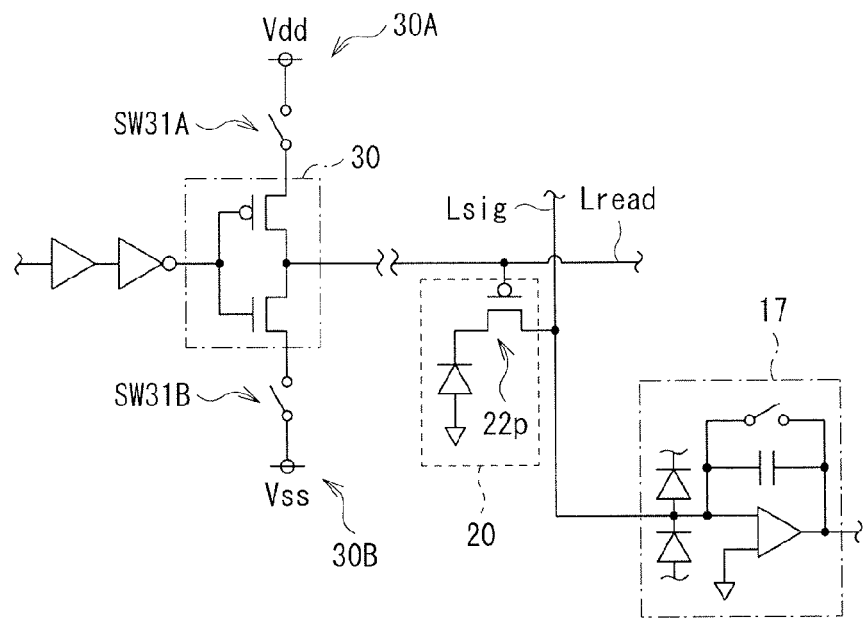
FIG. 19A is a circuit diagram illustrating one configuration example of main parts of the row scanning section, the pixel section, and the column selection section according to a modification example 4-1.
Figure 19B:
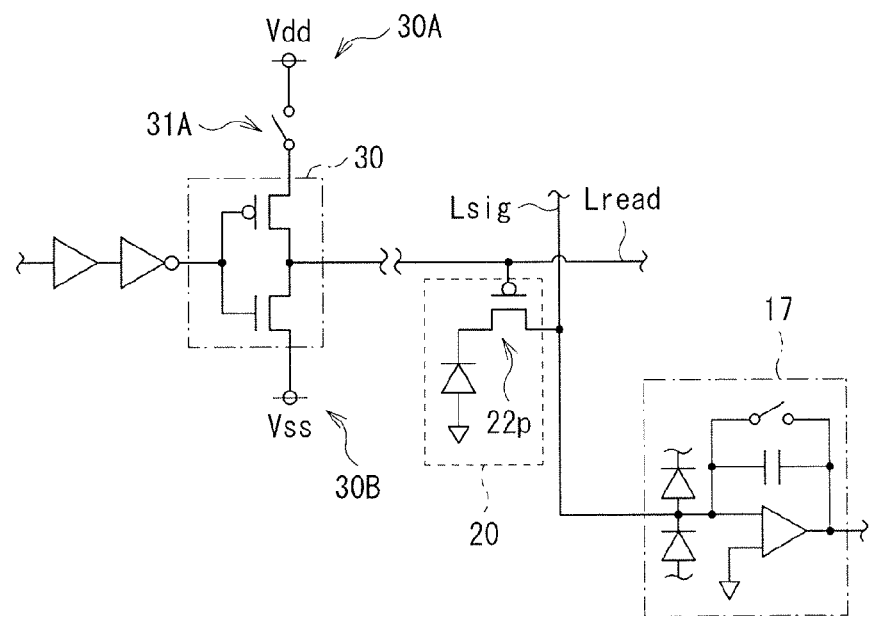
FIG. 19B is a circuit diagram illustrating one configuration example of main parts of the row scanning section, the pixel section, and the column selection section according to a modification example 4-2.

FIG. 19A is a circuit diagram illustrating one configuration example of main parts of the row scanning section, the pixel section, and the column selection section according to the modification example 4-1 and FIG. 19B is a circuit diagram illustrating one configuration example of main parts of the row scanning section, the pixel section, and the column selection section according to the modification example 4-2. Although in the above-mentioned embodiment and the modification example 3 and so forth, the examples of the case that the transistor 22 disposed in the pixel 20 is of the n-channel type have been described, a p-channel type transistor (a transistor 22$p$) may be used.

The switches SW31A and SW31B may be disposed respectively between the read-out control line Lread connected to the transistor 22$p$ and the positive side power source 30A and between the read-out control line Lread and the negative side power source 30B (FIG. 19A) and/or the switch may be disposed on either the positive side power source 30A side or the negative side power source 30B side also in this case. However, since the transistor 22$p$ is of the p-channel type, the voltage to be supplied from the positive side power source 30A via the buffer circuit 30 is applied as the voltage (the OFF voltage) that controls the transistor 22$p$ to the OFF state. Therefore, when the transistor 22$p$ is of the p-channel type, it is possible to effectively reduce the adverse effect caused by the line defect by disposing the switch SW31A on the positive side power source 30A side (FIG. 19B) for the same reason as that in the above-mentioned modification example 3. It is to be noted that the switch may be disposed only on the negative side power source 30B side for any other purpose not limited to the above.

<Modification Example 5-1 and 5-2>

Figure 20A:
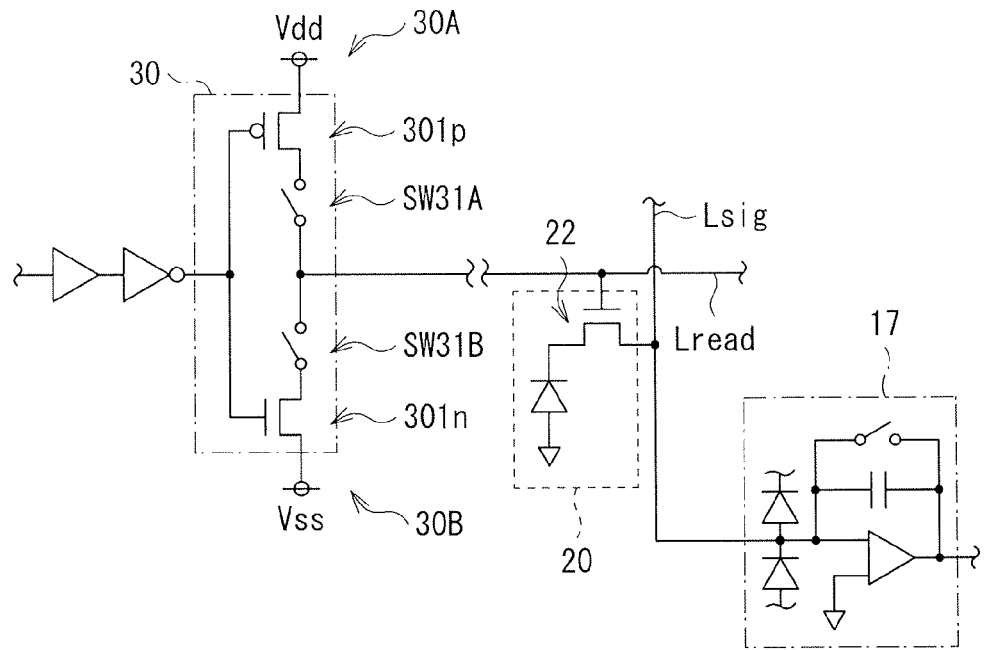
FIG. 20A is a circuit diagram illustrating one configuration example of main parts of the row scanning section, the pixel section, and the column selection section according a modification Example 5-1.
Figure 20B:
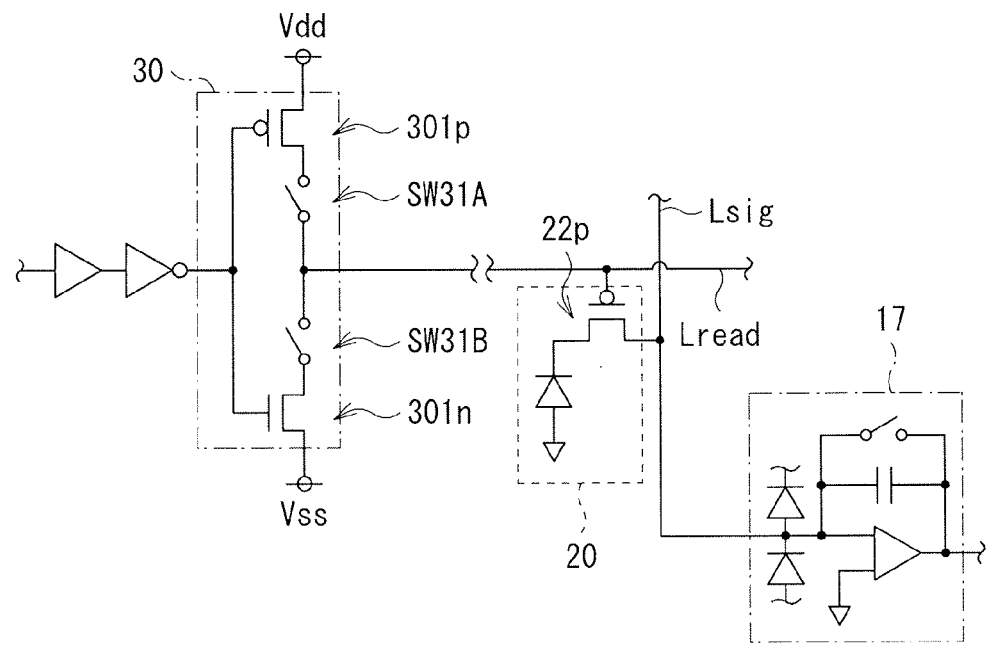
FIG. 20B is a circuit diagram illustrating one configuration example of main parts of the row scanning section, the pixel section, and the column selection section according a modification Example 5-2.

FIG. 20A is a circuit diagram illustrating one configuration example of main parts of the row scanning section, the pixel section, and the column selection section according to the modification example 5-1 and FIG. 20B is a circuit diagram illustrating one configuration example of main parts of the row scanning section, the pixel section, and the column selection section according to the modification example 5-2. Although in the above-mentioned embodiment, the configuration that the switch SW31A has been disposed between the transistor 301p and the positive side power source 30A of the buffer circuit 30 and the switch SW31B has been disposed between the transistor 301n and the negative side power source 30B of the buffer circuit 30 has been described by way of example, the layout of the switches SW31A and SW31B is not limited to the above. For example, the switch SW31A may be disposed between the transistor 301p and the read-out control line Lread and the switch SW31B may be disposed between the transistor 301n and the read-out control line Lread as in the present modification examples. It is to be noted that FIG. 20A illustrates an example that the transistor 22 (the n-channel type) has been disposed within the pixel 20 and FIG. 20B illustrates an example that the transistor 22p (the p-channel type) has been disposed in the pixel 20. Each of the present modification examples has the configuration that the switches SW31A and SW31B are arranged within the buffer circuit 30. That is, the switches SW31A and SW31B may be arranged anywhere as long as the switch SW31A (or the switch SW31B) is arranged on a wiring between the read-out control line Lread and the positive side power source 30A (or the negative side power source 30B).

<Modification Examples 6-1 and 6-2>

Figure 21A:
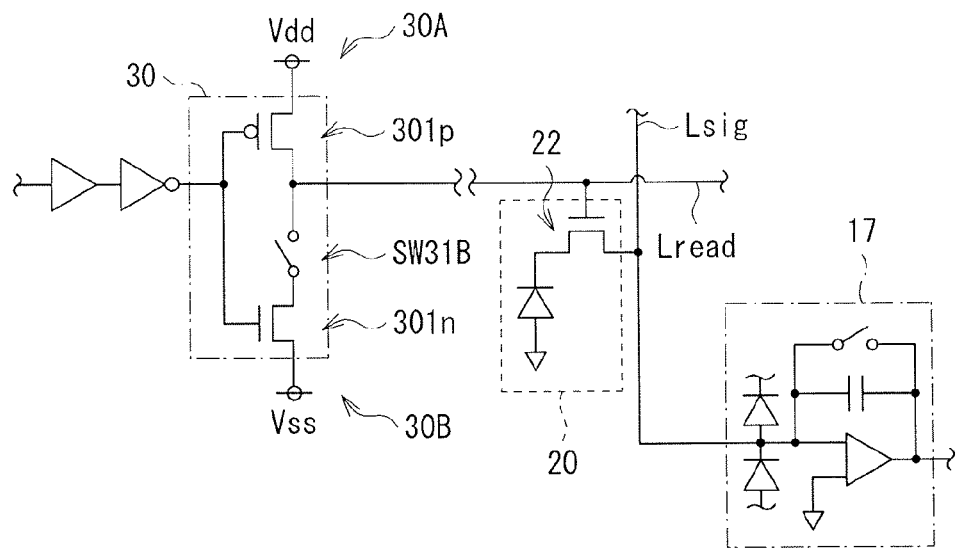
FIG. 21A is a circuit diagram illustrating one configuration example of main parts of the row scanning section, the pixel section, and the column selection section according to a modification example 6-1.
Figure 21B:
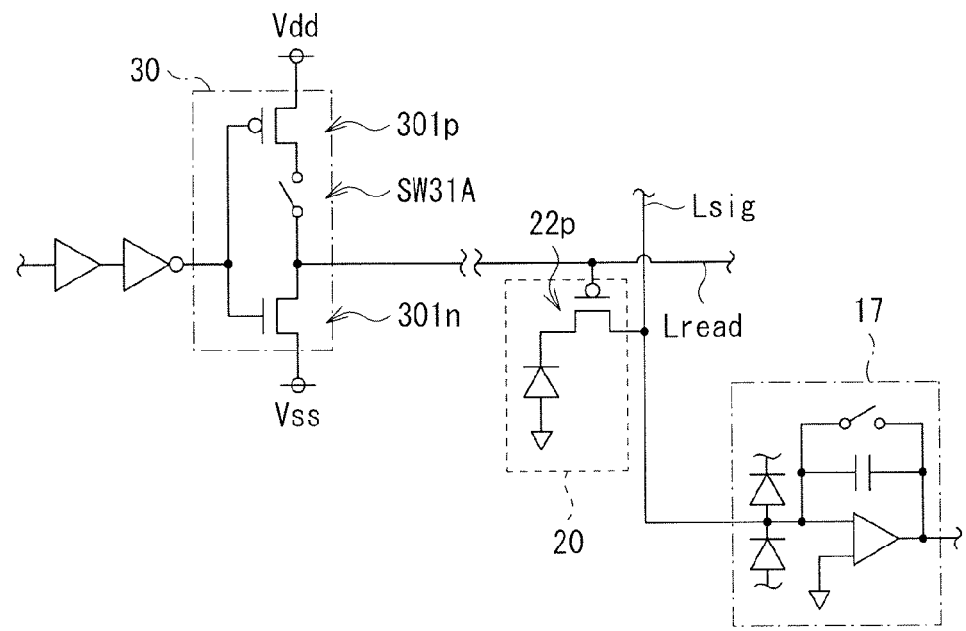
FIG. 21B is a circuit diagram illustrating one configuration example of main parts of the row scanning section, the pixel section, and the column selection section according to a modification example 6-2.

FIG. 21A is a circuit diagram illustrating one configuration example of main parts of the row scanning section, the pixel section, and the column selection section according to the modification example 6-1 and FIG. 21B is a circuit diagram illustrating one configuration example of main parts of the row scanning section, the pixel section, and the column selection section according to the modification example 6-2. As in the present modification examples, only either one of the switches SW31A and SW31B described in the above-mentioned modification examples 5-1 and 5-2 may be arranged. Specifically, in the example in FIG. 21A, since the transistor 22 of the pixel 20 is of the n-channel type, the switch 31B is disposed on the negative side power source 30B side (between the transistor 301n and the read-out control line Lread). In the example in FIG. 21B, since the transistor 22p of the pixel 20 is of the p-channel type, the switch SW31A is disposed on the positive side power source 30A side (between the transistor 301p and the read-out control line Lread).

<Modification Examples 7-1 and 7-2>

Figure 22A:
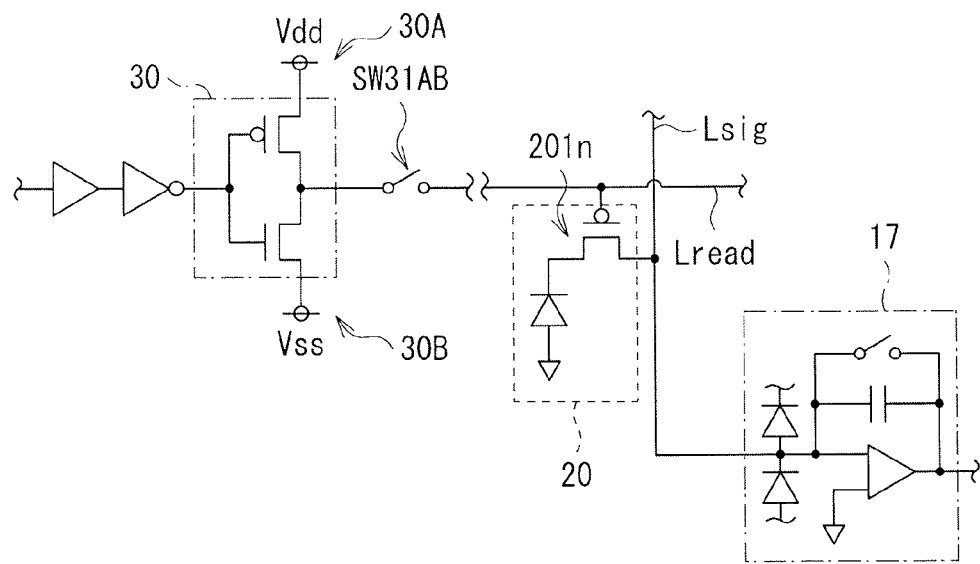
FIG. 22A is a circuit diagram illustrating one configuration example of main parts of the row scanning section, the pixel section, and the column selection section according to a modification example 7-1.
Figure 22B:
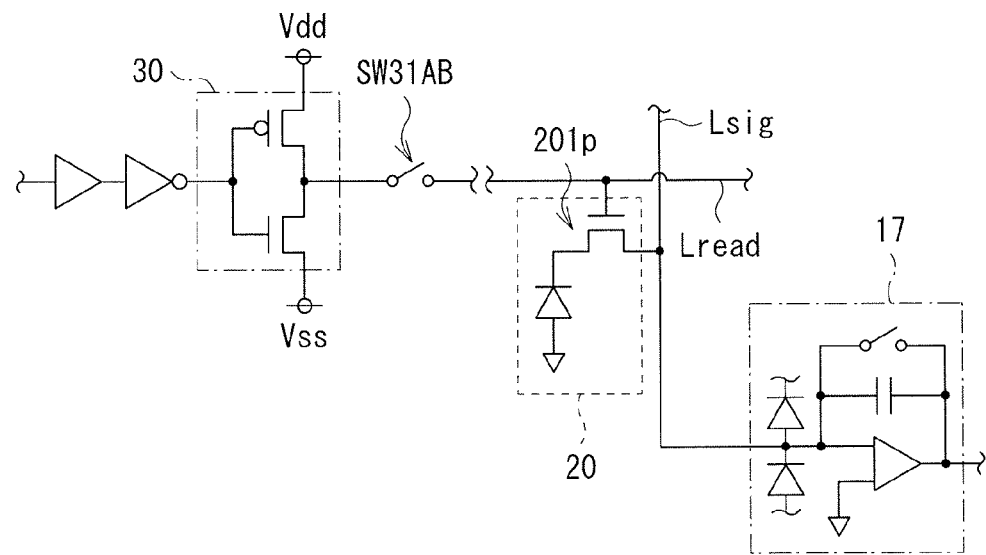
FIG. 22B is a circuit diagram illustrating one configuration example of main parts of the row scanning section, the pixel section, and the column selection section according to a modification example 7-2.

FIG. 22A is a circuit diagram illustrating one configuration example of main parts of the row scanning section, the pixel section, and the column selection section according to the modification example 7-1 and FIG. 22B is a circuit diagram illustrating one configuration example of main parts of the row scanning section, the pixel section, and the column selection section according to the modification example 7-2. Although in the above-mentioned embodiment and so forth, the switch SW31A and/or the switch SW31B have/has been disposed between the read-out control line Lread and the positive side power source 30A and/or between the read-out control line Lread and the negative side power source 30B, a configuration that one switch (a switch SW31AB) is disposed on the read-out control line Lread may be possible as in the present modification examples. In this case, the switch SW31AB has a CMOS structure in which a p-type transistor is combined with an n-type transistor. Although this structure is equivalent to the structure described in the above-mentioned embodiment in circuit, it is different from the structure of the above-mentioned embodiment in manufacturing process and device layout.

<Modification Example 8>

Figure 23:
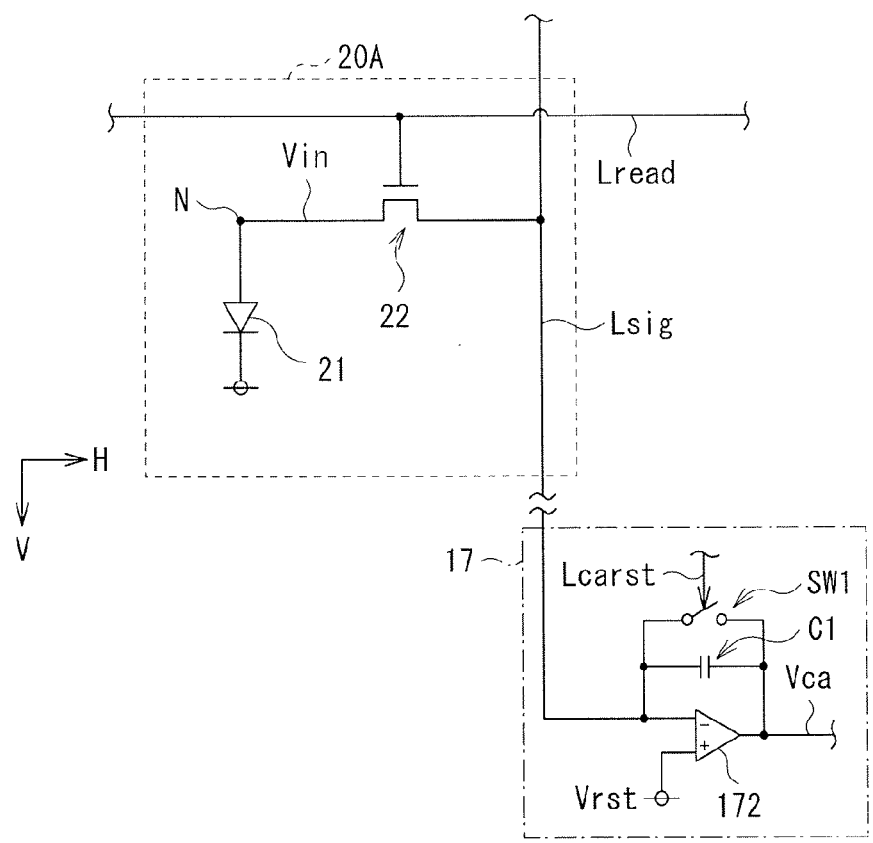
FIG. 23 is a circuit diagram illustrating one configuration example of a pixel and so forth according to a modification example 8.

FIG. 23 is a diagram illustrating one example of a circuit configuration of a pixel (a pixel 20A) according to the modification example 8 together with one example of the circuit configuration of the column selection section 17. The pixel 20A has the passive type circuit configuration as in the case of the pixel 20 of the above-mentioned embodiment and includes one photoelectric conversion element 21 and one transistor 22. In addition, the read-out control line Lread and the signal line Lsig are connected to the pixel 20A.

However in the pixel 20A of the present modification example, the anode of the photoelectric conversion element 21 is connected to the accumulation node N and the cathode thereof is connected to the power source differently from the pixel 20 of the above-mentioned embodiment. The accumulation node N may be connected to the anode of the photoelectric conversion element 21 in the pixel 20A as described above and it is possible to obtain same effects as those by the image pickup device 1 according to the above-mentioned embodiment also in the pixel 20A so configured.

<Modification Example 9>

Figure 24:
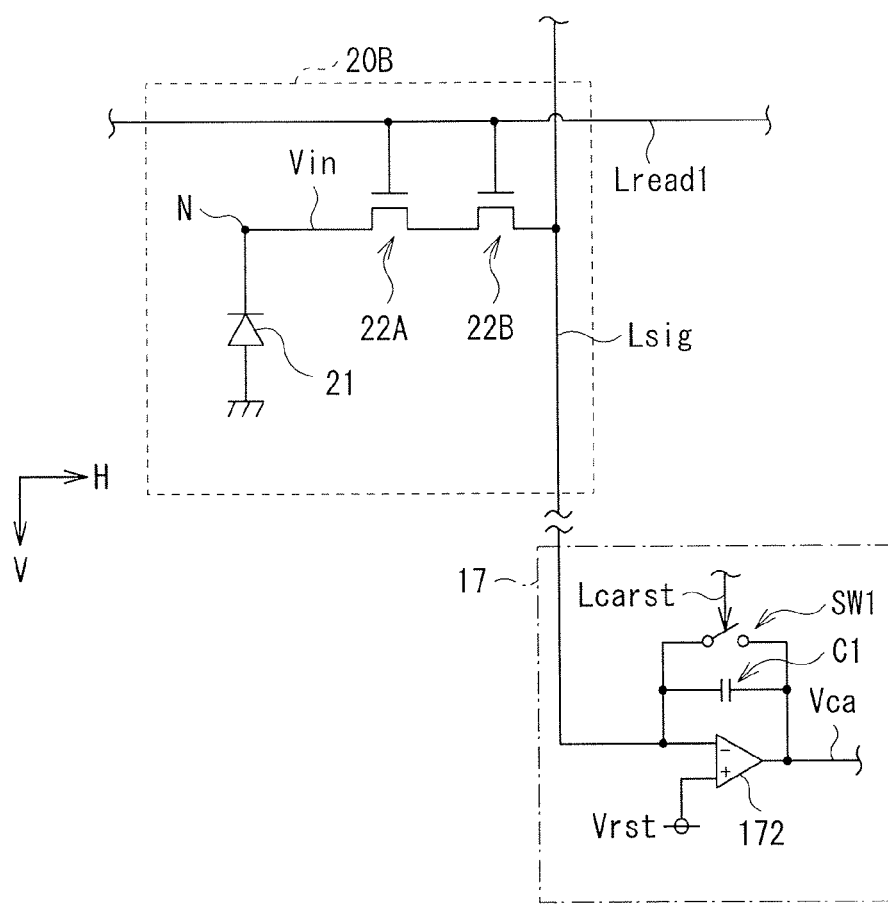
FIG. 24 is a circuit diagram illustrating one configuration example of a pixel and so forth according to a modification example 9.

FIG. 24 is a diagram illustrating one example of a circuit configuration of a pixel (a pixel 20B) according to the modification example 9 together with one example of the circuit configuration of the column selection section 17. The pixel 20B has the passive type circuit structure as in the case of the pixel 20 of the above-mentioned embodiment and is connected to the read-out control line Lread and the signal line Lsig.

However, in the present modification example, the pixel 20B includes one photoelectric conversion element 21 and two transistors (transistors 22A and 22B). These two transistors 22A and 22B are mutually connected in series (a source or a drain of one transistor is electrically connected with a source or a drain of the other transistor). In addition, gates of the respective transistors 22A and 22B are connected to the read-out control line Lread.

It is possible to obtain effects that are equivalent to those by the above-mentioned embodiment also when the two transistors 22A and 22B are disposed in the pixel 20B and the read-out control line Lread is connected to both of these transistors 22A and 22B in this way.

<Modification Examples 10-1 and 10-2>

Figure 25:
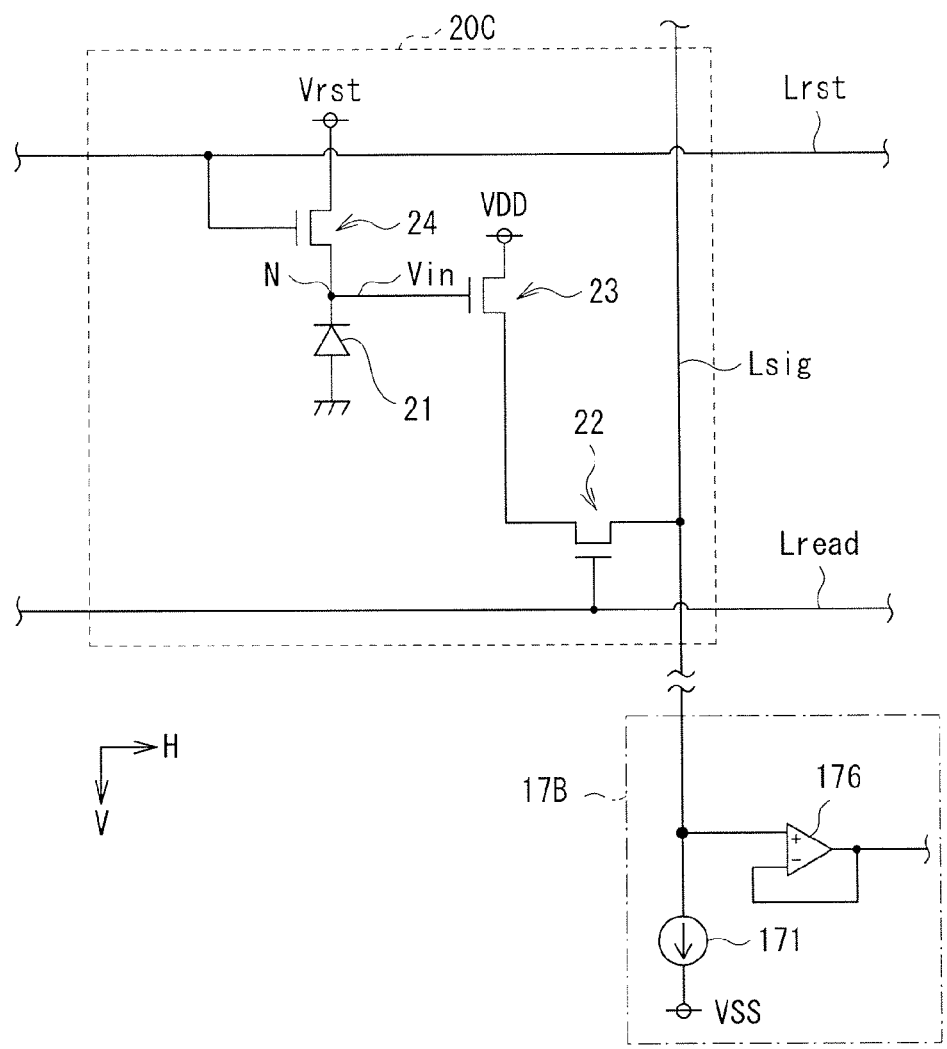
FIG. 25 is a circuit diagram illustrating one configuration example of a pixel and so forth according to a modification example 10-1.
Figure 26:
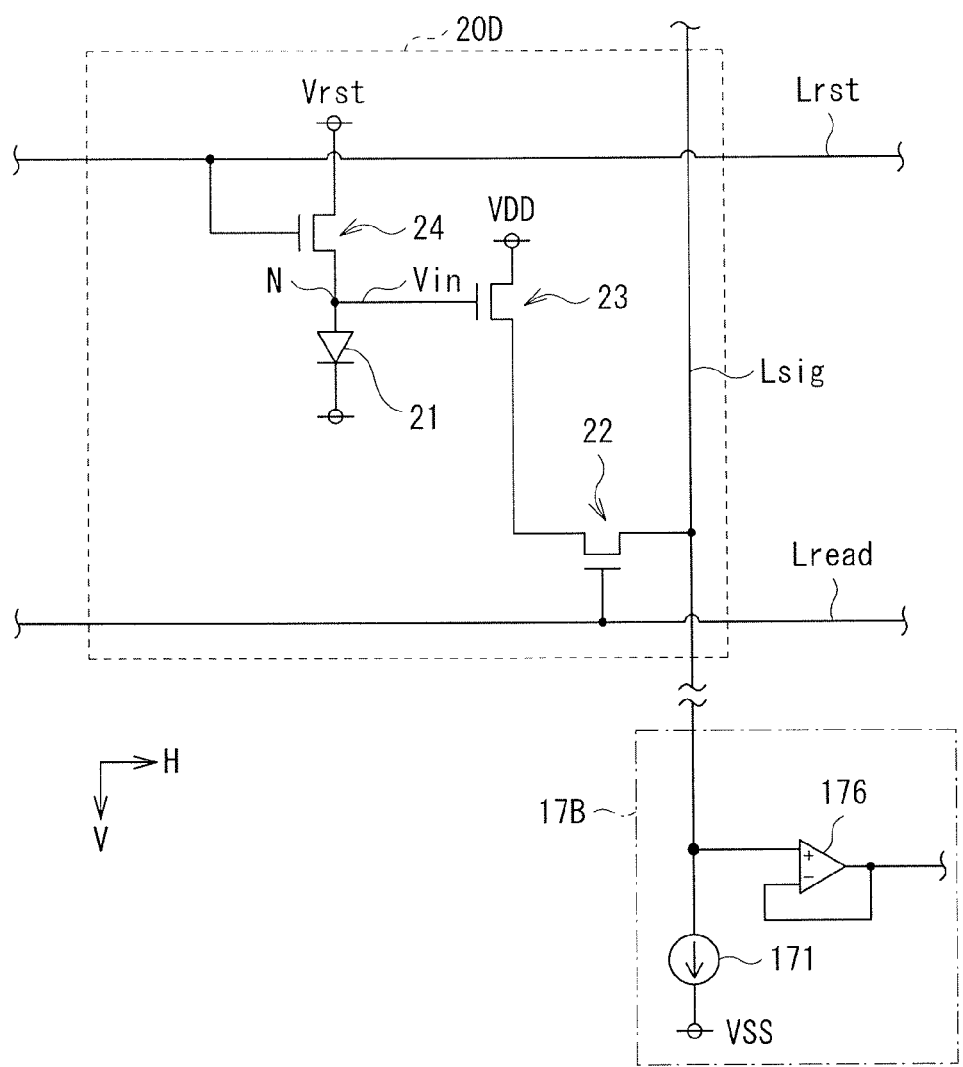
FIG. 26 is a circuit diagram illustrating one configuration example of a pixel and so forth according to a modification example 10-2.

FIG. 25 is a diagram illustrating one example of a circuit configuration of a pixel (a pixel 20C) according to the modification example 10-1 together with one example of a circuit configuration of a column selection section 17B. FIG. 26 is a diagram illustrating one example of a circuit configuration of a pixel (a pixel 20D) according to the modification example 10-2 together with one example of the circuit configuration of the column selection section 17B. The pixels 20C and 20D each have a so-called active type pixel circuit differently from the pixels 20, 20A, and 20B described so far.

Each of the pixels 20C and 20D includes one photoelectric conversion element 21 and three transistors 22, 23, and 24. In addition, a reset control line Lrst is connected to the pixel 20C or 20D in addition to the read-out control line Lread and the signal line Lsig.

In each of the pixels 20C and 20D, the gate of the transistor 22 is connected to the read-out control line Lread, the source thereof is connected to the signal line Lsig, and the drain thereof is connected to a source of the transistor 23 that configures a source follower circuit. A drain of the transistor 23 is connected to a power source VDD, a gate thereof is connected to the cathode (the example in FIG. 25) or the anode (the example in FIG. 26) of the photoelectric conversion element 21 and to a source of the transistor 24 that functions as a reset transistor. A gate of the transistor 24 is connected to the reset control line Lrst and the reset voltage Vrst is applied to a drain thereof. In the modification example 10-1 in FIG. 25, the anode of the photoelectric conversion element 21 is connected to the ground (grounded) and in the modification example 10-2 in FIG. 26, the cathode of the photoelectric conversion element 21 is connected to the power source.

The column selection section 17B includes a constant current source 171 and an amplifier 176 in place of the charge amplifier 172, the capacitor element C1, and the switch SW1 included in the aforementioned column selection section 17. In the amplifier 176, the signal line Lsig is connected to a positive side input terminal and a negative side input terminal and an output terminal are connected together to form a voltage follower circuit. It is to be noted that one terminal of the constant current source 171 is connected to one end side of the signal line Lsig and a power source VSS is connected to the other terminal of the constant current source 171.

Also in the image pickup device including the active type pixel 20C or 20D as described above, it is possible to obtain effects that are equivalent to those by the above-mentioned embodiment by providing the switches SW31A and SW31B for every read-out control line Lread and performing signal reading while controlling the open/close states of the switches SW31A and SW31B in the same way as in the above-mentioned embodiment. In addition, when each of the pixels 20C and 20D includes two or more switching elements as in the present modification examples, the switches SW31A and SW31B may be provided corresponding to the control line (the gate line) adapted to perform open/close control on one or more switching element(s). For example, the switches SW31A and SW31B may be provided for the read-out control line Lread to be connected to the gate of the transistor 22 for signal reading in the same way as in the above-mentioned embodiment and/or may be provided for the reset control line Lrst to be connected to the gate of the transistor 24. In addition, the switches SW31A and SW31B may be respectively provided for both of the read-out control line Lread and the reset control line Lrst.

<Application Example>

The image pickup device according to any of the above-mentioned embodiment and the modification examples may be utilized in the form of various types of radiation image pickup devices configured to obtain an electric signal on the basis of the incident radiation (for example, X rays) in such an image pickup display system as described below. The image pickup device may be applicable to, for example, a medical X-ray image pickup device (a digital radiography and so forth), a baggage-screening X-ray image pickup device used in an airport and so forth, and/or an industrial X-ray image pickup device used for examining dangerous goods and so forth in a container and so forth.

Figure 27:
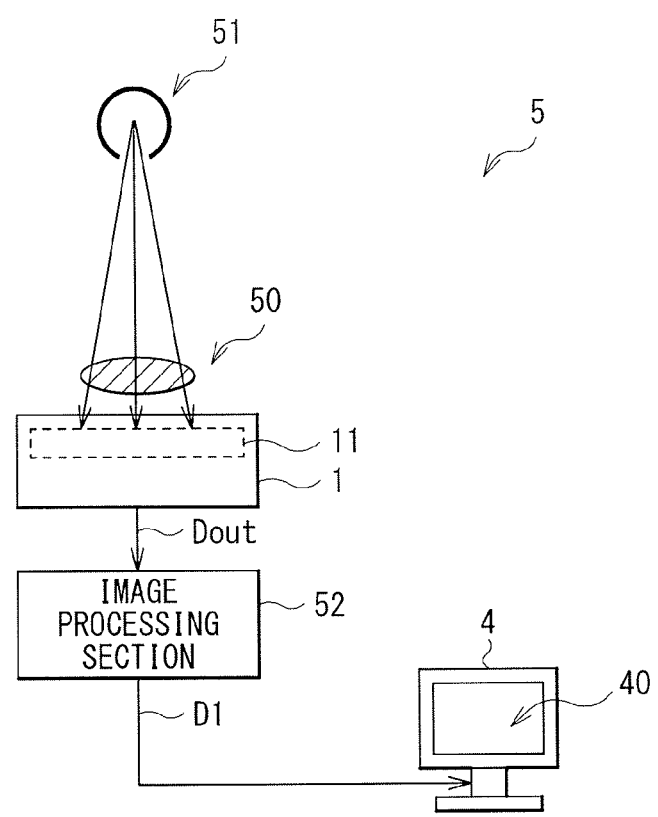
FIG. 27 is a schematic diagram illustrating one schematic configuration example of an image pickup display system according to an application example.

FIG. 27 is a schematic diagram illustrating one schematic configuration example of an image pickup display system (an image pickup display system 5) according to the application example. The image pickup display system 5 includes the image pickup device 1 that includes the above-mentioned pixel section 11, an image processing section 52, and a display 4.

The image processing section 52 is adapted to generate image data D1 by performing predetermined image processing on the output data Dout (the image pickup signal) output from the image pickup device 1. The display 4 is adapted to perform image display based on the image data D1 generated by the image processing section 52 on a predetermined monitor screen 40.

In this image pickup display system 5, the image pickup device 1 acquires the image data (the output data) Dout of an object 50 on the basis of the radiation radiated from a light source (a radiation source such as an X-ray source and so forth) 51 toward the object 50 and outputs the data so acquired to the image processing section 52. The image processing section 52 performs predetermined image processing on the input image data Dout and outputs the image data (display data) D1 subjected to the image processing to the display 4. The display 4 displays image information (a picked-up image) on the monitor screen 40 on the basis of the input image data D1.

Since, in the image pickup display system 5 of the present application example, it is possible to acquire the image of the object 50 as the electric signal by the image pickup device 1 as described above, it becomes possible to display the image by transmitting the acquired electric signal to the display 4. That is, it becomes possible to observe the image of the object without using such a radiographic film as has ever been used and it becomes possible to cope with moving image capturing and moving image display.

Although the example embodiment, the modification examples, and the application example of the present disclosure have been given as described above, the contents of the present disclosure are not limited to the above-mentioned embodiment, modification examples, and application example and may be modified in a variety of ways. For example, the circuit configuration of the pixel in the pixel section 11 may be another circuit configuration, not limited to the circuit configurations (the circuit configurations of the pixels 20, and 20A to 20D) described in the above-mentioned embodiment, modification examples and application example. Likewise, the circuit configurations of the row scanning section, the column selection section and so forth may be other circuit configurations, not limited to those described in the above-mentioned embodiment, modification examples, and application example.

Furthermore, the technology encompasses any possible combination of some or all of the various embodiments described herein and incorporated herein.

It is possible to achieve at least the following configurations from the above-described example embodiments of the disclosure.

(1) An image pickup device, including:

a plurality of pixels each including a photoelectric conversion element and one or more switching elements, the photoelectric conversion element being configured to generate a signal charge based on a wavelength of an incident ray;

a plurality of control lines provided to perform open/close control of at least one first switching element in the one or more switching elements;

a buffer circuit provided for each of the control lines, and configured to output a voltage to each of the control lines;

second switching elements each provided between corresponding one of the control lines and a power source of the corresponding buffer circuit; and a switch control circuit configured to perform open/close control of the second switching elements, the switch control circuit being, upon image pickup driving, configured to control one of the second switching elements, provided between a defect holding line that includes an electrically short-circuited part in the plurality of control lines and the power source of the buffer circuit of the defect holding line, to be in an open state, and configured to control another one of the second switching elements to be in a closed state.

(2) The image pickup device according to (1), wherein
the buffer circuit includes a CMOS circuit, and is connected to a low voltage source and a high voltage source, and
each of the second switching elements is disposed between the low voltage source, the high voltage source, or both, and corresponding one of the control lines.
(3) The image pickup device according to (2), wherein one of the second switching elements is disposed between the low voltage source and corresponding one of the control lines, and another one of the second switching elements is disposed between the high voltage source and corresponding one of the control lines.
(4) The image pickup device according to (2), wherein
the at least one first switching element is an n-channel transistor, and
one of the second switching elements is disposed at least between the low voltage source and corresponding one of the control lines.
(5) The image pickup device according to (2), wherein
the at least one first switching element is a p-channel transistor, and
one of the second switching elements is disposed at least between the high voltage source and corresponding one of the control lines.
(6) The image pickup device according to any one of (1) to (5),
wherein the switch control circuit includes a semiconductor memory element for each of the control lines, and
wherein the switch control circuit controls the corresponding second switching element to be in the open state or the closed state for each of the control lines by writing data into each of the semiconductor memory elements.
(7) The image pickup device according to (6),
wherein the switch control circuit controls the corresponding second switching element to be in the open state by writing first data into the semiconductor memory element provided corresponding to the defect holding line, and
wherein the switch control circuit controls the corresponding second switching element to be in the closed state by writing second data into the semiconductor memory element provided corresponding to the control line other than the defect holding line.
(8) The image pickup device according to (7), further including a drive section configured to perform read-out driving of the plurality of pixels,
wherein, in a state in which all of the second switching elements are controlled to be in the closed state by writing the second data into the semiconductor memory elements, the drive section
acquires image data based on the signal charge from each of the pixels, and
detects the defect holding line, based on the image data.
(9) The image pickup device according to any one of (1) to (8), further including a drive section configured to perform read-out driving of the plurality of pixels, wherein
the drive section, the buffer circuit, and the switch control circuit are provided on same substrate as the plurality of pixels.
(10) The image pickup device according to any one of (1) to (8), further including a drive section configured to perform read-out driving of the plurality of pixels, wherein
the drive section, the buffer circuit, and the switch control circuit are provided on a substrate that is different from a substrate on which the plurality of pixels are provided.
(11) The image pickup device according to any one of (1) to (10), wherein the defect holding line includes a part that is electrically short-circuited to a signal line through which the signal charge is output from each of the pixels.
(12) The image pickup device according to any one of (1) to (11), wherein the defect holding line includes a part that is electrically short-circuited to a bias line connected to one of the photoelectric conversion elements.
(13) The image pickup device according to any one of (6) to (8), wherein each of the semiconductor memory elements is a static random access memory.
(14) The image pickup device according to any one of (1) to (13), wherein the image pickup device is an indirect-conversion radiation image pickup device.
(15) The image pickup device according to (14), wherein each of the photoelectric conversion elements is one of a PIN photodiode, a PN photodiode, and a MIS sensor.
(16) The image pickup device according to any one of (1) to (13), wherein the image pickup device is a direct-conversion radiation image pickup device.
(17) The image pickup device according to (14), wherein radiation acquired by the indirect-conversion radiation image pickup device includes X-rays.
(18) An image pickup display system provided with an image pickup device and a display configured to perform image display based on an image pickup signal acquired by the image pickup device, the image pickup device including:
a plurality of pixels each including a photoelectric conversion element and one or more switching elements, the photoelectric conversion element being configured to generate a signal charge based on a wavelength of an incident ray;
a plurality of control lines provided to perform open/close control of at least one first switching element in the one or more switching elements;
a buffer circuit provided for each of the control lines, and configured to output a voltage to each of the control lines;
second switching elements each provided between corresponding one of the control lines and a power source of the corresponding buffer circuit; and
a switch control circuit configured to perform open/close control of the second switching elements, the switch control circuit being, upon image pickup driving, configured to control one of the second switching elements, provided between a defect holding line that includes an electrically short-circuited part in the plurality of control lines and the power source of the buffer circuit of the defect holding line, to be in an open state, and configured to control another one of the second switching elements to be in a closed state.

It should be understood by those skilled in the art that various modifications, combinations, sub-combinations and alterations may occur depending on design requirements and other factors insofar as they are within the scope of the appended claims or the equivalents thereof.

What is claimed is:
1. An image pickup device, comprising:
a plurality of pixels each including a photoelectric conversion element and one or more switching elements, the photoelectric conversion element being configured to generate a signal charge based on a wavelength of an incident ray;
a plurality of control lines provided to perform open/close control of at least one first switching element in the one or more switching elements;

a buffer circuit provided for each of the control lines, and configured to output a voltage to each of the control lines;

second switching elements each provided between corresponding one of the control lines and a power source of the corresponding buffer circuit; and a switch control circuit configured to perform open/close control of the second switching elements, the switch control circuit being, upon image pickup driving, configured to control one of the second switching elements, provided between a defect holding line that includes an electrically short-circuited part in the plurality of control lines and the power source of the buffer circuit of the defect holding line, to be in an open state, and configured to control another one of the second switching elements to be in a closed state.

2. The image pickup device according to claim 1, wherein the buffer circuit includes a CMOS circuit, and is connected to a low voltage source and a high voltage source, and each of the second switching elements is disposed between the low voltage source, the high voltage source, or both, and corresponding one of the control lines.

3. The image pickup device according to claim 2, wherein one of the second switching elements is disposed between the low voltage source and corresponding one of the control lines, and another one of the second switching elements is disposed between the high voltage source and corresponding one of the control lines.

4. The image pickup device according to claim 2, wherein the at least one first switching element is an n-channel transistor, and one of the second switching elements is disposed at least between the low voltage source and corresponding one of the control lines.

5. The image pickup device according to claim 2, wherein the at least one first switching element is a p-channel transistor, and one of the second switching elements is disposed at least between the high voltage source and corresponding one of the control lines.

6. The image pickup device according to claim 1, wherein the switch control circuit includes a semiconductor memory element for each of the control lines, and wherein the switch control circuit controls the corresponding second switching element to be in the open state or the closed state for each of the control lines by writing data into each of the semiconductor memory elements.

7. The image pickup device according to claim 6, wherein the switch control circuit controls the corresponding second switching element to be in the open state by writing first data into the semiconductor memory element provided corresponding to the defect holding line, and wherein the switch control circuit controls the corresponding second switching element to be in the closed state by writing second data into the semiconductor memory element provided corresponding to the control line other than the defect holding line.

8. The image pickup device according to claim 7, further comprising a drive section configured to perform read-out driving of the plurality of pixels, wherein, in a state in which all of the second switching elements are controlled to be in the closed state by writing the second data into the semiconductor memory elements, the drive section acquires image data based on the signal charge from each of the pixels, and detects the defect holding line, based on the image data.

9. The image pickup device according to claim 6, wherein each of the semiconductor memory elements is a static random access memory.

10. The image pickup device according to claim 1, further comprising a drive section configured to perform read-out driving of the plurality of pixels, wherein the drive section, the buffer circuit, and the switch control circuit are provided on same substrate as the plurality of pixels.

11. The image pickup device according to claim 1, further comprising a drive section configured to perform read-out driving of the plurality of pixels, wherein the drive section, the buffer circuit, and the switch control circuit are provided on a substrate that is different from a substrate on which the plurality of pixels are provided.

12. The image pickup device according to claim 1, wherein the defect holding line includes a part that is electrically short-circuited to a signal line through which the signal charge is output from each of the pixels.

13. The image pickup device according to claim 1, wherein the defect holding line includes a part that is electrically short-circuited to a bias line connected to one of the photoelectric conversion elements.

14. The image pickup device according to claim 1, wherein the image pickup device is an indirect-conversion radiation image pickup device.

15. The image pickup device according to claim 14, wherein each of the photoelectric conversion elements is one of a PIN photodiode, a PN photodiode, and a MIS sensor.

16. The image pickup device according to claim 14, wherein radiation acquired by the indirect-conversion radiation image pickup device comprises X-rays.

17. The image pickup device according to claim 1, wherein the image pickup device is a direct-conversion radiation image pickup device.

18. An image pickup display system provided with an image pickup device and a display configured to perform image display based on an image pickup signal acquired by the image pickup device, the image pickup device comprising:

a plurality of pixels each including a photoelectric conversion element and one or more switching elements, the photoelectric conversion element being configured to generate a signal charge based on a wavelength of an incident ray;

a plurality of control lines provided to perform open/close control of at least one first switching element in the one or more switching elements;

a buffer circuit provided for each of the control lines, and configured to output a voltage to each of the control lines;

second switching elements each provided between corresponding one of the control lines and a power source of the corresponding buffer circuit; and a switch control circuit configured to perform open/close control of the second switching elements, the switch control circuit being, upon image pickup driving, configured to control one of the second switching elements, provided between a defect holding line that includes an electrically short-circuited part in the plurality of control lines and the power source of the buffer circuit of the defect holding line, to be in an open state, and configured to control another one of the second switching elements to be in a closed state.

* * * * *